US009995861B2

(12) United States Patent
Coggio et al.

(10) Patent No.: US 9,995,861 B2
(45) Date of Patent: Jun. 12, 2018

(54) WIDE BAND SEMI-SPECULAR MIRROR FILM INCORPORATING NANOVOIDED POLYMERIC LAYER

(75) Inventors: William D. Coggio, Westford, MA (US); William B. Black, Eagan, MN (US); Michael F. Weber, Shoreview, MN (US); Huiwen Tai, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 527 days.

(21) Appl. No.: 13/878,625

(22) PCT Filed: Oct. 14, 2011

(86) PCT No.: PCT/US2011/056250
§ 371 (c)(1),
(2), (4) Date: Apr. 10, 2013

(87) PCT Pub. No.: WO2012/054318
PCT Pub. Date: Apr. 26, 2012

(65) Prior Publication Data
US 2013/0215512 A1   Aug. 22, 2013

Related U.S. Application Data

(60) Provisional application No. 61/405,141, filed on Oct. 20, 2010.

(51) Int. Cl.
*G02B 5/02* (2006.01)
*G02B 5/08* (2006.01)
*G02B 5/28* (2006.01)

(52) U.S. Cl.
CPC ........... *G02B 5/285* (2013.01); *G02B 5/0242* (2013.01); *G02B 5/0247* (2013.01); *G02B 5/0841* (2013.01)

(58) Field of Classification Search
CPC .. G02B 5/0205; G02B 5/0236; G02B 5/0247; G02B 5/0841; G02B 5/284; G02B 5/285; G02B 5/289; G02B 2207/107
(Continued)

(56) References Cited

U.S. PATENT DOCUMENTS 2,736,721 A   2/1956 Dexter
2,801,185 A   7/1957 Iler
(Continued)

FOREIGN PATENT DOCUMENTS

CN   2010-41589     3/2008
EP    1 626 295 A1   2/2006
(Continued)

OTHER PUBLICATIONS

Brunauer, "Adsorption of Gases in Multimolecular Layers", Journal of American Chemical Society, Feb. 1938, vol. 60, p. 309/319.
(Continued)

*Primary Examiner* — Kimberly N Kakalec
(74) *Attorney, Agent, or Firm* — Daniel J. Iden

(57) ABSTRACT

Low loss, high reflectivity wide band mirror films provide a desired mix of specular reflection and diffuse reflection or scattering to provide semi-specular reflectivity. The mirror films generally include both a specularly reflective multilayer optical film (MOF) having a wide reflection band, and a scattering layer. In some cases a low refractive index TIR layer is sandwiched between the MOF and the scattering layer. In other cases the scattering layer contacts the MOF directly. In embodiments that include the TIR layer, the TIR layer preferably has a nanovoided morphology and includes a plurality of particles and a polymer binder. In embodiments wherein the scattering layer contacts the MOF
(Continued)

directly, the scattering layer preferably also has a nano-voided morphology and includes a plurality of particles and a polymer binder.

16 Claims, 8 Drawing Sheets

(58) Field of Classification Search
USPC .............. 359/599; 428/304.4, 311.11, 317.9, 428/319.1; 362/355
See application file for complete search history.

(56) References Cited

U.S. PATENT DOCUMENTS

| | | | |
|---|---|---|---|
| 3,610,729 | A | 10/1971 | Rogers |
| 4,379,201 | A | 4/1983 | Heilmann |
| 4,446,305 | A | 5/1984 | Rogers |
| 4,522,958 | A | 6/1985 | Das |
| 4,554,324 | A | 11/1985 | Husman |
| 4,737,559 | A | 4/1988 | Kellen |
| 5,214,119 | A | 5/1993 | Leir et al. |
| 5,486,949 | A | 1/1996 | Schrenk |
| 5,506,279 | A | 4/1996 | Babu |
| 5,882,774 | A | 3/1999 | Jonza |
| 6,083,856 | A | 7/2000 | Joseph |
| 6,157,490 | A | 12/2000 | Wheatley |
| 6,179,949 | B1 | 1/2001 | Buluschek |
| 6,208,466 | B1 | 3/2001 | Liu |
| 6,210,858 | B1 | 4/2001 | Yasuda |
| 6,355,759 | B1 | 3/2002 | Sherman |
| 6,368,699 | B1 | 4/2002 | Gilbert |
| 6,569,521 | B1 | 5/2003 | Sheridan |
| 6,719,426 | B2 | 4/2004 | Magarill |
| 6,783,349 | B2 | 8/2004 | Neavin |
| 6,958,860 | B2 | 10/2005 | Dontula |
| 7,090,922 | B2 | 8/2006 | Zhou |
| 7,255,920 | B2 | 8/2007 | Everaerts |
| 7,361,474 | B2 | 4/2008 | Siegler |
| 2003/0035972 | A1 | 2/2003 | Hanson |
| 2004/0066556 | A1 | 4/2004 | Dontula |
| 2006/0057367 | A1 | 3/2006 | Sherman et al. |
| 2006/0290843 | A1 | 12/2006 | Epstein |
| 2008/0037127 | A1 | 2/2008 | Weber |
| 2008/0080055 | A1* | 4/2008 | Lightfoot ............. G02B 5/0242 359/599 |
| 2008/0192353 | A1* | 8/2008 | Nagahama .......... B29C 37/0053 359/599 |
| 2008/0303777 | A1 | 12/2008 | Inoue et al. |
| 2009/0009873 | A1* | 1/2009 | Laney ................. G02B 5/0226 359/599 |
| 2009/0105437 | A1 | 4/2009 | Determan |
| 2009/0114683 | A1 | 5/2009 | Chou |
| 2009/0267270 | A1 | 10/2009 | Murakami |
| 2009/0279313 | A1* | 11/2009 | Teragawa ............. G02B 5/0247 362/355 |
| 2010/0222496 | A1 | 9/2010 | Determan |
| 2012/0038984 | A1 | 2/2012 | Patel |
| 2012/0039089 | A1 | 2/2012 | Hao |
| 2013/0011608 | A1 | 1/2013 | Wolk |

FOREIGN PATENT DOCUMENTS

| | | |
|---|---|---|
| JP | 2006-058453 A | 3/2006 |
| JP | 2007-226123 A | 9/2007 |
| JP | 2010-008916 A | 1/2010 |
| JP | 2010-230816 A | 10/2010 |
| TW | 2010-03234 | 1/2010 |
| WO | WO 99/42536 | 8/1999 |
| WO | WO 01/22130 A1 | 3/2001 |
| WO | WO 2002/43937 | 6/2002 |
| WO | WO 2004/068597 A2 | 8/2004 |
| WO | WO 2006/031468 | 3/2006 |
| WO | WO 2007/002101 A1 | 1/2007 |
| WO | WO 2007/115040 | 10/2007 |
| WO | WO 2008/011919 | 1/2008 |
| WO | WO 2008007473 A1 * | 1/2008 ........... G02B 5/0247 |
| WO | WO 2008/144644 | 11/2008 |
| WO | WO 2009/085662 | 7/2009 |
| WO | WO 2009/089137 | 7/2009 |
| WO | WO 2010/044402 | 4/2010 |
| WO | WO 2010/120422 | 10/2010 |
| WO | WO 2010/120468 | 10/2010 |
| WO | WO 2010/120845 | 10/2010 |
| WO | WO 2010/120864 | 10/2010 |
| WO | WO 2010/120871 | 10/2010 |
| WO | WO 2010/120971 | 10/2010 |
| WO | WO 2010/121019 | 10/2010 |
| WO | WO 2010/121054 | 10/2010 |
| WO | WO 2011/088161 | 7/2011 |

OTHER PUBLICATIONS

Hrubesh, "Thin aerogel films for optical, thermal, acoustic and electronic applications", Journal of Non/Crystal Solids, 1995 vol. 188 p. 46/53.

Patton "Paint Flow and Pigment Dispersion", Chapter 5, 2nd Edition, Journal of Wiley Interscience, 1979, p. 126/160.

Sudduth, "Modeling Cluster Voids and Pigment Distribution to Predict Properties and CPVC in Coatings. Part 1: Dry Coating Analysis", Pigment and Resin Technology, 2008, vol. 37, No. 6, p. 375/388.

U.S. Appl. No. 61/294,600 to Wolk et al., filed Jan. 13, 2010, entitled *Microstructured Low Refractive Index Articles*.

U.S. Appl. No. 61/294,577 to Wolk et al., filed Jan. 13, 2010, entitled *Microstructured Low Refractive Index Article Process*.

TW 100137964 Search Report dated May 18, 2015; 2 pgs.

* cited by examiner

WIDE BAND SEMI-SPECULAR MIRROR FILM INCORPORATING NANOVOIDED POLYMERIC LAYER

FIELD OF THE INVENTION

This invention relates generally to optical films whose reflection and transmission characteristics are determined in large part by constructive and destructive interference of light reflected from interfaces between microlayers within the film, with particular application to such films that have very high reflectivity and low transmission of light over an extended wavelength range. The invention also relates to associated articles, systems, and methods.

BACKGROUND

Multilayer optical films are known. Such films typically incorporate a large number of very thin layers of different light transmissive materials, the layers being referred to as microlayers because they are thin enough so that the reflection and transmission characteristics of the optical film are determined in large part by constructive and destructive interference of light reflected from the layer interfaces. Depending on the amount of birefringence (if any) exhibited by the individual microlayers, and the relative refractive index differences for adjacent microlayers, and also on other design characteristics, the multilayer optical films can be made to have reflection and transmission properties that may be characterized as a reflective polarizer in some cases, and as a mirror in other cases, for example.

Reflective polarizers composed of a plurality of microlayers whose in-plane refractive indices are selected to provide a substantial refractive index mismatch between adjacent microlayers along an in-plane block axis and a substantial refractive index match between adjacent microlayers along an in-plane pass axis, with a sufficient number of layers to ensure high reflectivity for normally incident light polarized along one principal direction, referred to as the block axis, while maintaining low reflectivity and high transmission for normally incident light polarized along an orthogonal principal direction, referred to as the pass axis, have been known for some time. See, e.g., U.S. Pat. No. 3,610,729 (Rogers), U.S. Pat. No. 4,446,305 (Rogers et al.), and U.S. Pat. No. 5,486,949 (Schrenk et al.).

More recently, researchers from 3M Company have pointed out the significance of layer-to-layer refractive index characteristics of such films along the direction perpendicular to the film, i.e. the z-axis, and shown how these characteristics play an important role in the reflectivity and transmission of the films at oblique angles of incidence. See, e.g., U.S. Pat. No. 5,882,774 (Jonza et al.). Jonza et al. teach, among other things, how a z-axis mismatch in refractive index between adjacent microlayers, more briefly termed the z-index mismatch or $\Delta n_z$, can be tailored to allow the construction of multilayer stacks for which the Brewster angle—the angle at which reflectance of p-polarized light at an interface goes to zero—is very large or is nonexistent. This in turn allows for the construction of multilayer mirrors and polarizers whose interfacial reflectivity for p-polarized light decreases slowly with increasing angle of incidence, or is independent of angle of incidence, or increases with angle of incidence away from the normal direction. As a result, multilayer films having high reflectivity for both s- and p-polarized light for any incident direction in the case of mirrors, and for the selected direction in the case of polarizers, over a wide bandwidth, can be achieved.

Some multilayer optical films are designed for narrow band operation, i.e., over a narrow range of wavelengths, while others are designed for use over a broad wavelength range such as substantially the entire visible or photopic spectrum, or the visible or photopic wavelength range together with near infrared wavelengths, for example.

Some reflective films are designed to reflect light specularly, such that a collimated incident beam is reflected as a collimated or substantially collimated (e.g., having a full-width-at-half-maximum power of no more than 1.0 degrees, or no more than 0.3 degrees) reflected beam. A conventional household or automotive mirror is an example of a specularly reflective film. Other reflective films are designed to reflect light diffusely, such that a collimated incident beam is reflected into a large cone, such as an entire hemisphere, of different scattering directions—for example, the reflected light may have a full-width-at-half-maximum power of at least 15 degrees, or at least 45 degrees). "Flat white" paint is an example of a diffusely reflective film.

In some cases, it is desirable for a reflective film to provide a mixture or suitable balance of specular reflection and diffuse reflection. We refer to such films as "semi-specular" reflective films. One application for such a film may be an edge-lit optical cavity that emits light over an extended area, which may be useable as a backlight, for example. Three such cavities are depicted in FIGS. 1a, 1b, and 1c. An edge-mounted light source may be mounted at the left end of each cavity, but is omitted from the drawings for generality.

A pure specular reflector performs according to the optical rule that "the angle of reflection equals the angle of incidence." This is seen in the hollow cavity 116a of FIG. 1a. There, front and back reflectors, 112a, 114a are both purely specular. A small portion of an initially launched oblique light ray 150a is transmitted through the front reflector 112a, but the remainder is reflected at an equal angle to the back reflector 114a, and reflected again at an equal angle to the front reflector 112a, and so on as illustrated. This arrangement provides maximum lateral transport of the light across the cavity 116a, since the recycled ray is unimpeded in its lateral transit of the cavity 116a. However, no angular mixing occurs in the cavity, since there is no mechanism to convert light propagating at a given incidence angle to other incidence angles.

A purely Lambertian (diffuse) reflector, on the other hand, redirects light rays equally in all directions. This is seen in the hollow cavity 116b of FIG. 1b, where the front and back reflectors 112b, 114b are both purely Lambertian. The same initially launched oblique light ray 150b is immediately scattered in all directions by the front reflector 112b, most of the scattered light being reflected back into the cavity 116b but some being transmitted through the front reflector 112b. Some of the reflected light travels "forward" (generally to the right as seen in the figure), but an equal amount travels "backward" (generally to the left). By forward scattering, we refer to the lateral or in-plane (in a plane parallel to the scattering surface in question) propagation components of the reflected light. When repeated, this process greatly diminishes the forward-directed component of a light ray after several reflections. The beam is rapidly dispersed, producing minimal lateral transport.

A semi-specular reflector provides a balance of specular and diffusive properties. In the hollow cavity 116c of FIG. 1c, the front reflector 112c is purely specular but the back reflector 114c is semi-specular. The reflected portion of the same initially launched oblique light ray 150c strikes the back reflector 114c, and is substantially forward-scattered in a controlled amount. The reflected cone of light is then partially transmitted but mostly reflected (specularly) back to the back reflector 114c, all while still propagating to a great extent in the "forward" direction.

Semi-specular reflectors can thus be seen to promote the lateral spreading of light across the recycling cavity, while still providing adequate mixing of light ray directions and polarization. Reflectors that are partially diffuse but that have a substantially forward directed component may thus transport more light across a greater distance with fewer total reflections of the light rays. Reference is made to PCT publication WO 2008/144644 (Weber et al.).

Certain design challenges arise when combining a diffusing layer with an MOF. Reference in this regard is made to PCT publication WO 2007/115040 (Weber), "Wide Angle Mirror System". The design challenges stem from the MOF effectively being optically immersed in a medium of refractive index greater than air, such that light scattered at highly oblique angles by the scattering layer can propagate through the microlayers of the MOF at angles ("supercritical" angles) that are more oblique than the critical angle for the MOF when immersed in air. This effect, combined with the fact that the reflection band of the MOF shifts to shorter wavelengths as the propagation angle increases, and the fact that the spectral width of the reflection band is limited by the number of optical repeat units (ORUs) of microlayers used in the MOF, can result in some of the scattered light, particularly at longer wavelengths, propagating all the way through the MOF to the back or rear major surface thereof. Any dirt or other disturbances such as absorbing materials that are present on such back major surface may cause that light to be absorbed or otherwise lost, detracting from the total reflectivity of the construction. Some solutions to these design challenges are discussed in the '040 PCT publication. However, additional solutions would be of benefit to optical system manufacturers and designers.

BRIEF SUMMARY

We have found that semi-specular reflective mirror films can be used to provide highly efficient light guides that may evenly distribute light across a backlight area or display area even in cases where the light source is located at one end or edge of the device, e.g., in the case of a backlight or other extended-area light source that uses one or more edge-mounted LED light sources. The semi-specular mirror films described further herein may find utility in a variety of applications, such as energy efficient display devices that use fewer and brighter LED sources, and/or direct-lit fluorescent or LED lighting devices having high efficiency and/or high spatially uniformity, and/or transflective displays designed for use in daylight with little or no supplemental lighting provided by edge-mounted or panel-mounted light sources. Other potential applications include the use of the semi-specular mirror films in room lighting, recessed lighting, desk lamps, edge light reflectors, light pipes, decorative lighting devices, displays used for signage applications such as advertisement displays cases, lighting devices for temperature controlled displays, thermally molded reflectors, and other articles used in lighting.

The semi-specular mirror films disclosed herein typically involve a combination of a specularly reflective multilayer optical film (MOF) and at least one scattering layer that is laminated or otherwise attached to a front major surface of the MOF, optionally with one or more intervening layers of substantially solid light-transmissive material, but with no intervening optically thick air gap between the scattering layer and the MOF. The amount of scattering or haze provided by the scattering layer can be tailored to be small, medium, or large, depending upon the mix of specular and diffuse reflectivity that is desired in the intended application.

We have developed semi-specular mirror films that incorporate both a multilayer optical film (MOF) having a wide reflection band, and a scattering layer. The amount of scattering can be tailored to provide a desired mix of specular and diffuse reflection so as to provide semi-specular reflectivity. In some embodiments, a low refractive index TIR layer is sandwiched between the MOF and the scattering layer; in other embodiments, the scattering layer contacts the MOF directly. In embodiments that include the TIR layer, the TIR layer preferably has a nanovoided morphology and includes a polymer binder and a plurality of particles. In embodiments in which the scattering layer contacts the MOF directly, the scattering layer preferably also has a nanovoided morphology and includes a polymer binder and a plurality of particles. In any case, the resulting semi-specular mirror films can be made to have very high total reflectivity, with corresponding low loss, over a broad wavelength band such as the visible spectrum, and can also be tailored to have a controlled blend or mix of scattering and specular reflection.

The present application therefore discloses, inter alia, reflective films that include a multilayer optical mirror film (an MOF) and a diffusing layer in contact with a first major surface of the MOF. The MOF includes a plurality of microlayers configured to provide a broad reflection band, and the reflection band shifts as a function of incidence angle. The diffusing layer is adapted to scatter visible light into the multilayer optical film over a range of angles such that the scattered light can be substantially reflected by the broad reflection band. Further, the diffusing layer has a nanovoided morphology and comprises a polymer binder, and preferably also comprises a plurality of particles.

The broad reflection band of the MOF may have, for normally incident light, a long wavelength band edge disposed at a wavelength no greater than 1000 nm, or no greater than 1200 nm, or no greater than 1400 nm, or no greater than 1600 nm, and the reflective film may provide visible light scattering corresponding to a transport ratio of less than 80%, and the reflective film may also have a total hemispheric reflectivity for visible light of at least 97% when a rear surface of the reflective film is in contact with an absorbing material. In some cases, the scattering provided by the film may be high enough so that transport ratio is less than 60%, or less than 40%.

The diffusing layer may have a void volume fraction of at least 40%, 50%, or 60%. In cases where the diffusing layer includes a plurality of particles, the particles may comprise silicon dioxide or aluminum oxide. The particles in the diffusing layer may also be characterized by a size distribution that includes small particles, aggregates, and agglomerates of the small particles. A weight ratio of particles in the diffusing layer to polymer binder in the diffusing layer may be at least 1, or at least 2, or at least 4, or at least 6, or at least 7.

The diffusing layer may be characterized by a scattering distribution into a substrate of refractive index $n_s$ when illuminated by a normally incident beam of visible light, wherein $n_s$ is a minimum refractive index of the plurality of microlayers in the MOF. In some cases, the scattering distribution may be substantially reduced at grazing angles in the substrate. The scattering distribution may have a value $S_0$ at a scattering angle (i.e., deviation angle within the substrate relative to the normally incident beam) of 0 degrees and a value $S_{60}$ at a scattering angle of 60 degrees, and $S_{60}$ may be less than 10% of $S_0$. The scattering distribution may also have a value $S_{70}$ at a scattering angle of 70 degrees, and $S_{70}$ may similarly be less than 10% of $S_0$. The scattering distribution may have a value $S_{50}$ at a scattering angle of 50 degrees, and $S_{50}$ may also be less than 10% of $S_0$.

We also disclose reflective films that include a multilayer optical mirror film (an MOF), a diffusing layer, and a low refractive index layer (also referred to as a TIR layer) sandwiched between the MOF and the diffusing layer. The MOF includes a plurality of microlayers configured to provide a broad reflection band, and the reflection band shifts as a function of incidence angle. The diffusing layer is adapted to scatter visible light into a first angular portion that, if coupled into the multilayer optical film, can be substantially reflected by the broad reflection band, and a second angular portion that, if coupled into the multilayer optical film, cannot be substantially reflected by the broad reflection band. The reflective film is preferably constructed such that visible light that is scattered into the second angular portion is substantially blocked from entering the multilayer optical film by total internal reflection at the low refractive index layer. The low refractive index layer, sometimes also referred to as a TIR layer, has a nanovoided morphology and includes a polymer binder and also preferably a plurality of particles. The low refractive index layer may have a refractive index of less than 1.3 or less than 1.25, or less than 1.2, for example.

The broad reflection band may have, for normally incident light, a long wavelength band edge disposed at a wavelength no greater than 1600 nm, or no greater than 1400 nm, or no greater than 1200 nm, or no greater than 1000 nm, and the reflective film may provide visible light scattering corresponding to a transport ratio of less than 80%, the reflective film also having a total hemispheric reflectivity for visible light of at least 97% when a rear surface of the reflective film is in contact with an absorbing material. A short wavelength band edge of the broad reflection band, for normally incident light, may be disposed at or near 400 nm, e.g. in a range from 350-450 nm. In some cases, the transport ratio of the reflective film may be less than 60%, or less than 40%.

The low refractive index layer may have a void volume fraction of at least 40%, 50%, or 60%. The particles in the low refractive index layer may comprise silicon dioxide. A weight ratio of the particles in the low refractive index layer to the polymer binder in the low refractive index layer may be at least 1, or at least 2, or at least 4, at least 6, or at least 7.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

FIG. 8b is a schematic sectional view of the system of FIG. 8a.

In the figures, like reference numerals designate like elements.

DETAILED DESCRIPTION OF ILLUSTRATIVE EMBODIMENTS

As outlined above, we describe herein, among other things, semi-specular mirror films that advantageously incorporate at least one nanovoided layer having a polymer binder so as to achieve high total reflectivity and correspondingly low loss over a broad wavelength range of interest such as the visible spectrum. The void volume fraction of the nanovoided layer, i.e., the fractional volume of the layer occupied by voids (sometimes also referred to herein as "porosity"), may be at least 40%, or at least 50% or 60%. The high void volume fractions, in combination with the very small size distribution of the voids, allow for nanovoided layers that are characterized by very low effective refractive indices (provided the scattering or haze of the layer is low enough to permit measurement of the refractive index), e.g., less than 1.3, or less than 1.25, or less than 1.2, but greater than 1. The nanovoided layer also preferably incorporates a plurality of particles. The particles may comprise silicon dioxide or other inorganic or organic materials. A weight ratio of the binder to particles in the nanovoided layer is preferably between 1:7 to 1:2 or about 87.5% particles to 66.7% particles. The design details of the nanovoided layer can be tailored to provide a significant amount of scattering or haze in some cases, and little or no significant scattering or haze in other cases. In the former cases, the size distribution of the plurality of particles throughout the nanovoided layer may be characterized by a population of small particles and a separate population of aggregates of the small particles. Such a distribution may be bimodal. If the nanovoided layer is made to have significant haze, it is preferably disposed directly atop a broadband multilayer optical mirror film to provide a low loss high reflectivity semi-specular mirror film. If the nanovoided layer is made to have little or no significant haze, it is preferably disposed between a scattering layer and a broadband multilayer optical mirror film to provide low loss high reflectivity semi-specular mirror film.

Figure 1A:
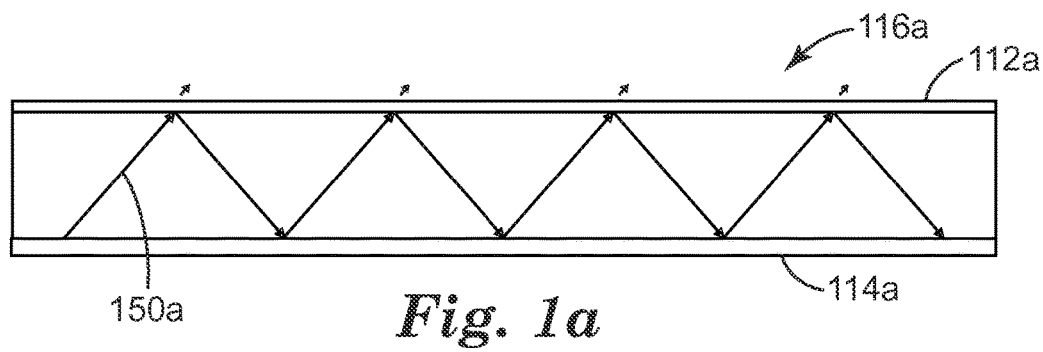
FIG. 1a is a schematic side view of an optical cavity that employs specular reflectors.
Figure 1B:
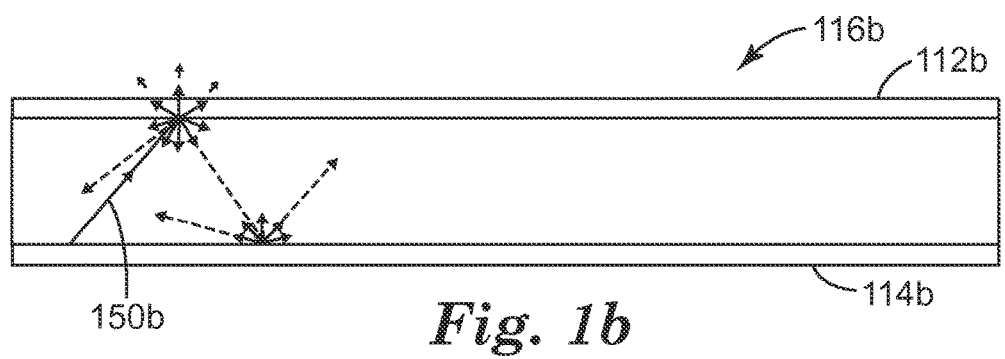
FIG. 1b is a schematic side view of an optical cavity that employs diffuse reflectors.
Figure 1C:
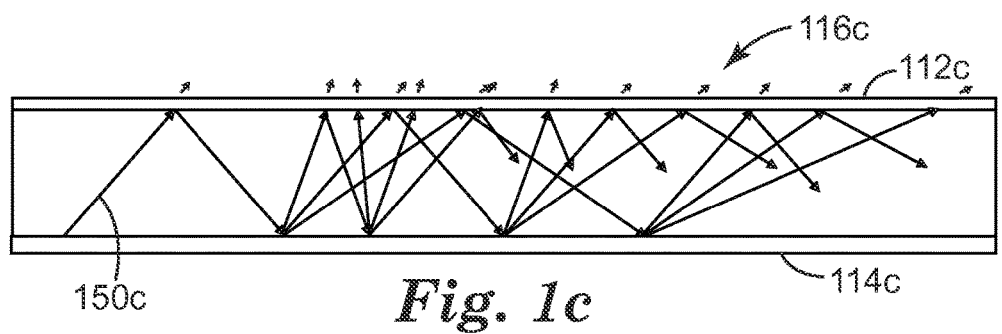
FIG. 1c is a schematic side view of an optical cavity that employs a semi-specular reflector.
Figure 2A:
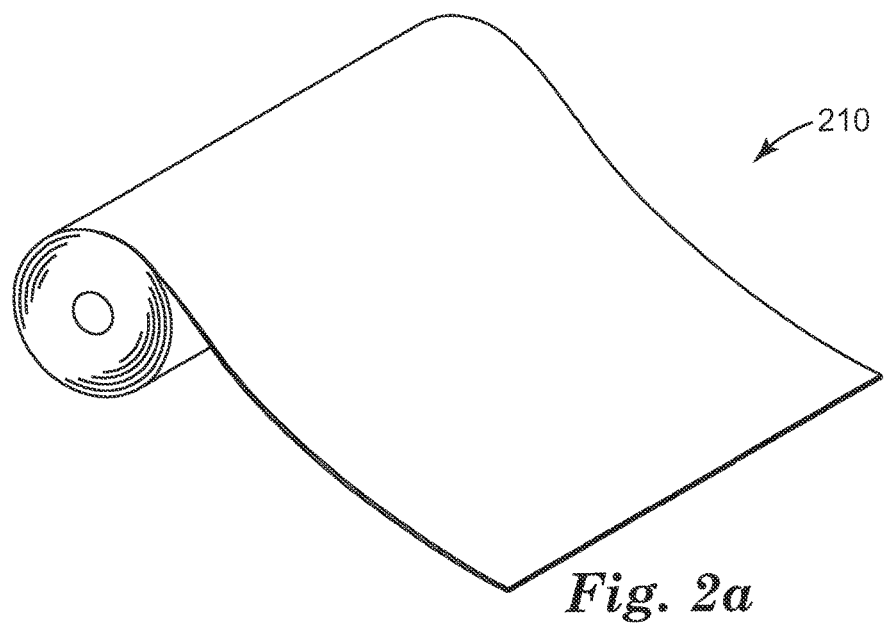
FIG. 2a is a schematic perspective view of a roll of multilayer optical film or of a finished semi-specular mirror film.

The disclosed semi-specular mirror films are compatible with high volume continuous and roll-to-roll manufacturing processes, although other processes such as batch fabrication processes may be used if desired. FIG. 2a depicts a roll of multilayer optical film (MOF) 210 as is may appear either before or after the further application of a scattering layer (and in some cases a low refractive index or TIR layer) to form a semi-specular reflective film. In the discussion that follows, we assume for simplicity that the MOF 210 has not yet been combined with a scattering layer or TIR layer.

Broadband MOF Mirror Films

Although in most applications of interest to the present application the MOF 210 is designed to have a high reflectivity over a wavelength band of interest such as the visible spectrum and for all polarizations and all practical incidence angles, in general the film may exhibit a certain amount of transmission, reflection, and absorption for light of any given wavelength, incident direction, and polarization state. In general, transmission (T) plus reflection (R) plus absorption (A) of the MOF for any given incident light ray is 100%, or T+R+A=100%. In exemplary embodiments, the MOF may be composed entirely of materials that have low absorption over at least a majority of the visible wavelength spectrum. In such cases, the absorption A may be negligibly small, e.g. less than 1%, and the above relationship may be expressed as:

$T+R \approx 100\%$.

Figure 2B:
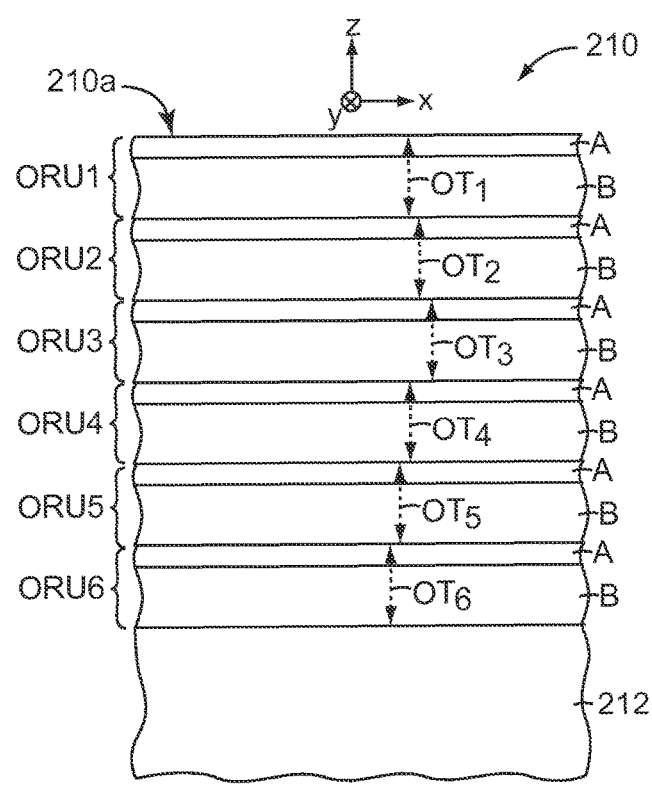
FIG. 2b is a schematic side or sectional view of a multilayer optical film, showing interior microlayers arranged in a packet to form a series of optical repeat units.

Turning now to FIG. 2b, we see there a portion of MOF 210 in schematic side view to reveal the structure of the film including its interior layers. The film is shown in relation to a local x-y-z Cartesian coordinate system, where the film extends parallel to the x- and y-axes, and the z-axis is perpendicular to the film and its constituent layers and parallel to a thickness axis of the film. The film 210 need not be entirely flat, but may be curved or otherwise shaped to deviate from a plane, and even in those cases arbitrarily small portions or regions of the film can be associated with a local Cartesian coordinate system as shown.

Multilayer optical films include individual layers having different refractive indices so that some light is reflected at interfaces between adjacent layers. These layers, sometimes referred to as "microlayers", are sufficiently thin so that light reflected at a plurality of the interfaces undergoes constructive or destructive interference to give the MOF the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 μm. However, thicker layers can also be included, such as skin layers at the outer surfaces of the multilayer optical film, or protective boundary layers (PBLs) disposed within the multilayer optical film to separate coherent groupings (known as "stacks" or "packets") of microlayers. In FIG. 2b, the microlayers are labeled "A" or "B", the "A" layers being composed of one material and the "B" layers being composed of a different material, these layers being stacked in an alternating arrangement to form Optical Repeat Units or unit cells ORU 1, ORU 2, ... ORU 6 as shown. Typically, a multilayer optical film composed entirely of polymeric materials would include many more than 6 optical repeat units if high reflectivities are desired. The substantially thicker layer 212 at the bottom of the figure can represent an outer skin layer, or a PBL that separates the stack of microlayers shown in the figure from another stack or packet of microlayers (not shown). If desired, two or more separate multilayer optical films can be laminated together, e.g. with one or more thick adhesive layers, or using pressure, heat, or other methods to form a laminate or composite film.

In some cases, the microlayers can have thicknesses and refractive index values corresponding to a ¼-wave stack, i.e., arranged in optical repeat units each having two adjacent microlayers of equal optical thickness (f-ratio=50%, the f-ratio being the ratio of the optical thickness of a constituent layer "A" to the optical thickness of the complete optical repeat unit), such optical repeat unit being effective to reflect by constructive interference light whose wavelength λ is twice the overall optical thickness of the optical repeat unit, where the "optical thickness" of a body refers to its physical thickness multiplied by its refractive index. In other cases, the optical thickness of the microlayers in an optical repeat unit may be different from each other, whereby the f-ratio is greater than or less than 50%. In the embodiment of FIG. 2b, the "A" layers are depicted for generality as being thinner than the "B" layers. Each depicted optical repeat unit (ORU 1, ORU 2, etc.) has an optical thickness ($OT_1$, $OT_2$, etc.) equal to the sum of the optical thicknesses of its constituent "A" and "B" layer, and each optical repeat unit reflects light whose wavelength λ is twice its overall optical thickness. The reflectivity provided by microlayer stacks or packets used in multilayer optical films in general is typically substantially specular in nature, rather than diffuse, as a result of the generally smooth well-defined interfaces between microlayers, and the low haze materials that are used in a typical construction.

In exemplary embodiments, the optical thicknesses of the optical repeat units may differ according to a thickness gradient along the z-axis or thickness direction of the film, whereby the optical thickness of the optical repeat units increases, decreases, or follows some other functional relationship as one progresses from one side of the stack (e.g. the top) to the other side of the stack (e.g. the bottom). Such thickness gradients can be used to provide a widened reflection band to provide substantially spectrally flat transmission and reflection of light over the extended wavelength band of interest, and also over all angles of interest. Thickness gradients tailored to sharpen the band edges at the wavelength transition between high reflection and high transmission can also be used, as discussed in U.S. Pat. No. 6,157,490 (Wheatley et al.) "Optical Film With Sharpened Bandedge". For polymeric multilayer optical films, reflection bands can be designed to have sharpened band edges as well as "flat top" reflection bands, in which the reflection properties are essentially constant across the wavelength range of application. Other layer arrangements, such as multilayer optical films whose optical repeat units include more than two microlayers, are also contemplated.

For applications involving visible light, polymeric multilayer optical films can be made with a reasonable number of microlayers and a thickness gradient that produces a reflection band extending over substantially the entire visible spectrum so that reflected light has little or no observable "color" to an ordinary observer. For such films, the smallest values of the thickness gradient (i.e., the thinnest ORUs) can be selected so that the short wavelength band edge of the reflection band (e.g. the short wavelength at which reflectivity drops to half maximum, for normally incident light) falls at or near 400 nm, e.g., in a range from 350 to 450 nm, for example. The largest values of the thickness gradient can be selected so that the long wavelength band edge of the reflection band (e.g. the long wavelength at which reflectivity drops to half maximum, for normally incident light) falls at a near infrared wavelength beyond the visual red limit of about 700 nm. The long wavelength band edge may be tailored to fall at a near infrared wavelength in a range from about 900-1600 nm, or from about 900-1400 nm, or from about 900-1200 nm, or from about 900-1000 nm, for example, but these ranges are merely exemplary and should not be considered as limiting. The long wavelength band edge is designed for such a near infrared wavelength so that the MOF is able to maintain high reflectivity for light in the wavelength range of interest that is incident on the film at non-normal incident angles. Thus, as light is incident on the film at increasingly oblique incident angles, the reflection band of the MOF (and its short and long band edges) shifts to increasingly shorter wavelengths. At the design limit, the long wavelength band edge, which resides in the near infrared at normal incidence, shifts to a position at or near the visual red limit (e.g. in a range from 650-750 nm) for light at a maximum anticipated incidence angle. The concomitant shift of the short wavelength band to a position in the ultraviolet region is usually inconsequential to system designers.

The reader will appreciate that even for MOF mirror films that are perfectly symmetrical for normally incident light (same reflectivity regardless of polarization), illumination with obliquely incident light will in general produce different reflectivities, and different positions of the short and long wavelength band edges of the reflection band, depending on whether the s-polarized component or the p-polarized component of such oblique light is considered. Unless otherwise stated to the contrary, such differences between s- and p-polarization reflectivity are ignored for purposes of this application.

As mentioned above, adjacent microlayers of the multilayer optical film have different refractive indices so that some light is reflected at interfaces between adjacent layers. We refer to the refractive indices of one of the microlayers (e.g. the "A" layers in FIG. 2b) for light polarized along principal x-, y-, and z-axes as $n1x$, $n1y$, and $n1z$, respectively. We refer to the refractive indices of the adjacent microlayer (e.g. the "B" layers in FIG. 2) along the same axes as $n2x$, $n2y$, $n2z$, respectively. We refer to the differences in refractive index between the A and B layers as $\Delta nx$ (=$n1x-n2x$) along the x-direction, $\Delta ny$ (=$n1y-n2y$) along the y-direction, and $\Delta nz$ (=$n1z-n2z$) along the z-direction. The nature of these refractive index differences, in combination with the number of microlayers in the film (or in a given stack of the film) and their thickness distribution, controls the reflective and transmissive characteristics of the MOF (or of the given stack of the MOF).

For example, in order to make a mirror-like reflective film that has high reflectivity for normally incident light of any polarization state, the MOF is tailored such that adjacent microlayers have a large refractive index mismatch along both orthogonal in-plane directions, i.e., $\Delta nx$ large and $\Delta ny$ large. In this regard, a mirror film may be considered for purposes of this application to be an optical body that strongly reflects normally incident light that is polarized along one in-plane axis if the wavelength is within the reflection band of the packet, and also strongly reflects such light that is polarized along an orthogonal in-plane axis. "Strongly reflects" may have different meanings depending on the intended application or field of use, but in many cases an MOF mirror film will have at least 70, 80, 90, or 95% reflectivity for the specified light. Reflectivity of the mirror film can, but need not, be the same for the two orthogonal in-plane axes. In this regard, the distinction between a mirror film and a polarizer film may in some cases depend on the application or system in which the film is to be used. In exemplary embodiments, the MOF mirror film is designed to have a reflectivity for normally incident light (averaged over the visible spectrum) of at least 90%, or at least 95%, for light polarized along the x-axis as well as for light polarized along the y-axis. Reflectivities referred to herein can generally be converted to corresponding transmissivities using the approximation $R+T\approx 100\%$.

In variations of the foregoing embodiments, the adjacent microlayers may exhibit a refractive index match or mismatch along the z-axis ($\Delta nz\approx 0$ or $\Delta nz$ large), and the mismatch may be of the same or opposite polarity or sign as the in-plane refractive index mismatches. Such tailoring of $\Delta nz$ plays a key role in whether the reflectivity of the p-polarized component of obliquely incident light increases, decreases, or remains the same with increasing incidence angle. In exemplary embodiments, the MOF mirror film, to the extent possible, maintains high reflectivity even for highly oblique light, and may even provide increased reflectivity at oblique angles so long as the wavelength of the light is within the reflection band for the particular oblique incident angle. To help achieve this behavior, we may select $\Delta nz$ between adjacent microlayers to be substantially zero, or to be non-zero with an opposite polarity or sign as the in-plane refractive index mismatches.

Exemplary multilayer optical mirror films are composed of polymer materials and may be fabricated using coextruding, casting, and orienting processes. Reference is made to U.S. Pat. No. 5,882,774 (Jonza et al.) "Optical Film", U.S. Pat. No. 6,179,949 (Merrill et al.) "Optical Film and Process for Manufacture Thereof", and U.S. Pat. No. 6,783,349 (Neavin et al.) "Apparatus for Making Multilayer Optical Films". The multilayer optical film may be formed by coextrusion of the polymers as described in any of the aforementioned references. The polymers of the various layers are preferably chosen to have similar rheological properties, e.g., melt viscosities, so that they can be coextruded without significant flow disturbances. Extrusion conditions are chosen to adequately feed, melt, mix, and pump the respective polymers as feed streams or melt streams in a continuous and stable manner. Temperatures used to form and maintain each of the melt streams may be chosen to be within a range that avoids freezing, crystallization, or unduly high pressure drops at the low end of the temperature range, and that avoids material degradation at the high end of the range.

In brief summary, the fabrication method may comprise: (a) providing at least a first and a second stream of resin corresponding to the first and second polymers to be used in the finished film; (b) dividing the first and the second streams into a plurality of layers using a suitable feedblock, such as one that comprises: (i) a gradient plate comprising first and second flow channels, where the first channel has a cross-sectional area that changes from a first position to a second position along the flow channel, (ii) a feeder tube plate having a first plurality of conduits in fluid communication with the first flow channel and a second plurality of conduits in fluid communication with the second flow channel, each conduit feeding its own respective slot die, each conduit having a first end and a second end, the first end of the conduits being in fluid communication with the flow channels, and the second end of the conduits being in fluid communication with the slot die, and (iii) optionally, an axial rod heater located proximal to said conduits; (c) passing the composite stream through an extrusion die to form a multilayer web in which each layer is generally parallel to the major surface of adjacent layers; and (d) casting the multilayer web onto a chill roll, sometimes referred to as a casting wheel or casting drum, to form a cast multilayer film. This cast film may have the same number of layers as the finished film, but the layers of the cast film are typically much thicker than those of the finished film. Furthermore, the layers of the cast film are typically all isotropic.

After cooling, the multilayer web can be drawn or stretched to produce the near-finished multilayer optical film, details of which can be found in the references cited above. The drawing or stretching accomplishes two goals: it thins the layers to their desired final thicknesses, and it orients the layers such that at least some of the layers become birefringent. The orientation or stretching can be accomplished along the cross-web direction (e.g. via a tenter), along the down-web direction (e.g. via a length orienter), or any combination thereof, whether simultaneously or sequentially. If stretched along only one direction, the stretch can be "unconstrained" (wherein the film is allowed to dimensionally relax in the in-plane direction perpendicular to the stretch direction) or "constrained" (wherein the film is constrained and thus not allowed to dimensionally relax in the in-plane direction perpendicular to the stretch direction). If stretched along both in-plane directions, the stretch can be symmetric, i.e., equal along the orthogonal in-plane directions, or asymmetric. Alternatively, the film may be stretched in a batch process. In any case, subsequent or concurrent draw reduction, stress or strain equilibration, heat setting, and other processing operations can also be applied to the film.

The multilayer optical films and film bodies can also include additional layers and coatings selected for their optical, mechanical, and/or chemical properties. For example, a UV absorbing layer can be added at one or both major outer surfaces of the film to protect the film from long-term degradation caused by UV light. Additional layers and coatings can also include scratch resistant layers, tear resistant layers, and stiffening agents. See, e.g., U.S. Pat. No. 6,368,699 (Gilbert et al.).

Figure 3A:
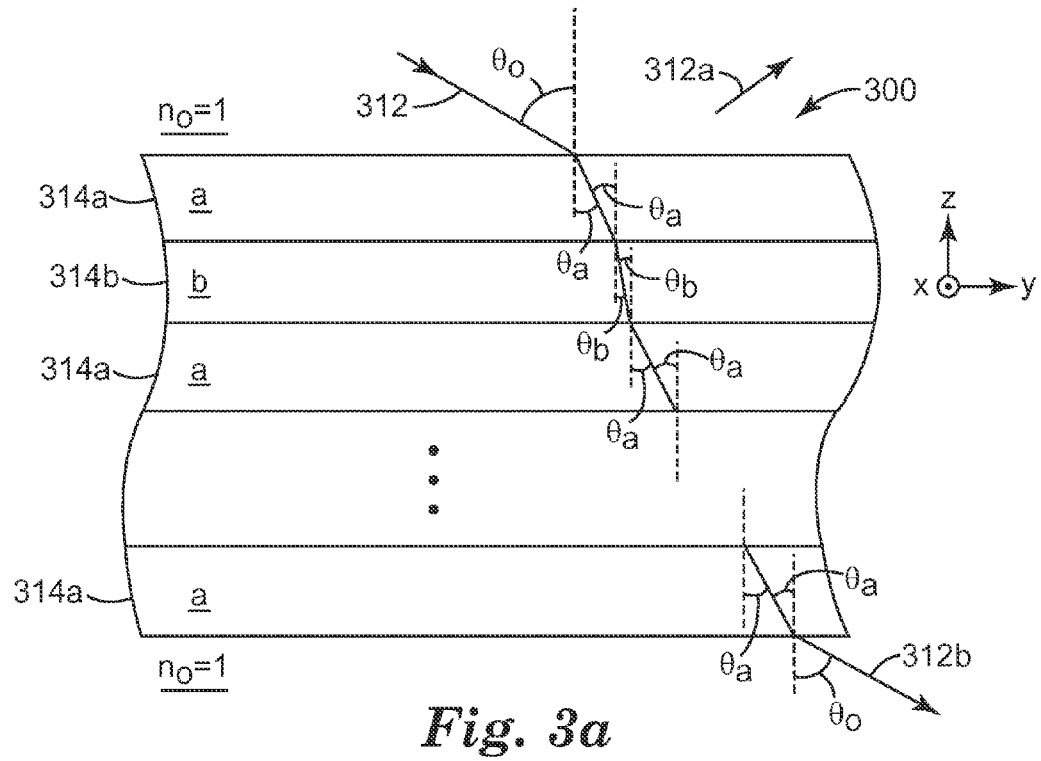
FIG. 3a is a schematic side or sectional view of a multilayer optical film immersed in air.

FIG. 3a shows in schematic cross-section a thin film interference stack 300 such as a MOF specularly reflective mirror film immersed in an air medium of refractive index $n_0=1$. A Cartesian x-y-z coordinate system is also shown for reference purposes. Light 312 of a particular wavelength and polarization is incident on the stack at an angle $\theta_0$, interacting with the stack to produce a reflected beam 312a and a transmitted beam 312b. The stack includes typically tens, hundreds, or thousands of microlayers 314a, 314b, composed respectively of optical materials a, b arranged in an interference stack, for example a quarter-wave stack. Optical materials a, b can be any suitable materials known to have utility in interference stacks, but are preferably organic and more particularly polymeric, e.g., polyethylene naphthalate (PEN), polymethyl methacrylate (PMMA), polyethylene terephthalate (PET), acrylic, and other conventional polymer materials such as those disclosed in U.S. Pat. No. 5,882,774 (Jonza et al.). Initially, for ease of explanation, we discuss the interaction of the incident beam 312 with the stack 300 assuming the microlayers are isotropic, but the results can be readily extended to birefringent microlayers.

Each of the microlayers 314a, 314b has an optical thickness that is a fraction of a wavelength of light. The microlayers are arranged in repeating patterns referred to as optical repeat units (ORUs) as discussed above, for example where the optical thickness of the ORU is half the wavelength of light to be reflected in the wavelength range of interest.

For simplicity of illustration, only the refracted portion of incident light 312 is depicted in FIG. 3a, but the reader will understand that wavelets of reflected light are also produced at the interfaces of the microlayers, and the coherent summation of those wavelets yields the reflected beam 312a. As the incident light 312 encounters the stack 300, it refracts from an angle of $\theta_0$ in air to an angle of $\theta_a$ in microlayer 314a. From there, it bends even further towards the surface normal (which is parallel to the z-axis) as it enters microlayer 314b, achieving a propagation angle $\theta_b$. After more refractions in the alternating a,b layers, the light emerges as transmitted beam 312b, which is also understood to be the coherent summation of all wavelets transmitted through the stack 300.

We now consider the effect of changing the direction of the incident light. If no limits are placed on the direction of the incident light, e.g., if we illuminate the stack from all directions in air, the incident angle $\theta_0$ ranges from 0 to 90°. The light propagation angle in the microlayers also changes, but because of the different refractive indices they do not sweep out a 90 degree half-angle. Rather, they sweep out a half-angle of $\theta_{ac}$ for layers 314a and $\theta_{bc}$ for layers 314b. The angles $\theta_{ac}$ and $\theta_{bc}$ are the "critical angles" for the 314a layers and the 314b layers respectively. When the stack 300 is immersed in air, the critical angle for a given microlayer represents the maximum angle (measured in the given microlayer itself, relative to the surface normal or z-axis) that light originating from outside the stack will propagate through the microlayer, provided the outer surfaces of the stack or film are substantially smooth and flat. The critical angle $\theta_{ac}$ can be calculated as $\sin^{-1}(1/n_a)$, where $n_a$ is the refractive index of the layers 314a, and the critical angle $\theta_{bc}$ can be calculated as $\sin^{-1}(1/n_b)$, where $n_b$ is the refractive index of the layers 314b.

Figure 3B:
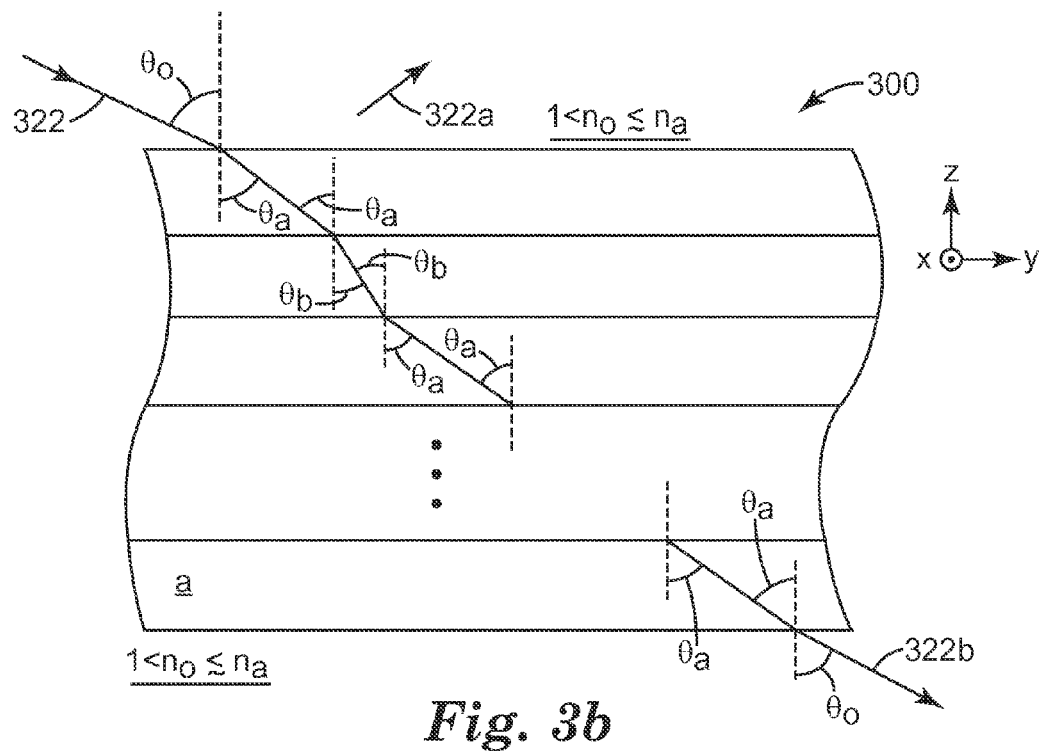
FIG. 3b is a similar view of the same film immersed in a higher refractive index medium.

FIG. 3b schematically demonstrates what happens when the same stack 300 is immersed in a denser medium whose refractive index $n_0$ is greater than that of air but about equal to or less than that of the lowest refractive index microlayer in the stack, i.e., $1<n_0 \leq n_a$. In this case, an incident light beam 322 again interacts with the stack 300 to yield a reflected beam 322a and a transmitted beam 322b, and the angle of reflection for reflected beam 322a and the angle of transmission for transmitted beam 322b are again equal to the angle of incidence $\theta_0$ of the original beam. What is different from FIG. 3a, however, is how the light propagates through the microlayers of the stack. Assuming the incident angle $\theta_0$ of FIG. 3b is the same as that of FIG. 3a, the angles of refraction $\theta_a$ and $\theta_b$ are greater (more oblique) in FIG. 3b than the corresponding angles in FIG. 3a. This is a consequence of Snell's law.

We again consider the effect of changing the direction of the incident light, but now for the case of light originating in the denser medium of FIG. 3b. If no limits are placed on the direction of the incident light, e.g., if we illuminate the stack from all directions in the denser medium (e.g. where the denser medium contains scattering centers), the incident angle $\theta_0$ ranges from 0 to 90°, and the light propagation angle in the microlayers changes in accordance with Snell's law. $n_0 \approx n_a$ then the propagation angle in the "a" microlayers sweeps out a full 90 degree half-angle, while the propagation angle in the "b" microlayers sweeps out a half-angle less than 90 degrees. If $1<n_0<n_a$ then the propagation angles in both the "a" and "b" microlayers sweep a half-angle less than 90 degrees. In both cases, however, the propagation angle in each of the microlayers sweeps out a half-angle that is greater than its respective critical angle in air. In other words, highly oblique light that is incident from the denser medium will propagate through each microlayer at an angle that is greater than (more oblique than) its critical angle. Such light, which is referred to as supercritical light, propagates through the microlayer stack at angles referred to as supercritical angles.

Unless appropriate steps are taken, this supercritical light can cause the reflectivity of the MOF film to degrade below acceptable levels because of two factors: (1) the reflectivity, for the p-polarized component of the light, of each dielectric/dielectric interface between adjacent microlayers in the stack decreases with increasing incidence angle—to a minimum of zero at Brewster's angle; and (2) the reflection band of the stack shifts toward shorter optical wavelengths as the angle of incidence increases, shifting so far at extreme angles of incidence that it no longer covers the entire wavelength range of interest, or even so far that it no longer covers any portion of the wavelength range of interest. Regarding factor (1), the teachings of U.S. Pat. No. 5,882,774 (Jonza et al.) provide guidance on how this problem can be solved by utilizing at least some birefringent microlayers in the stack, and by selecting refractive indices of adjacent microlayers so as to reduce, eliminate, or even reverse the usual behavior (exhibited with isotropic microlayers) of decreasing reflectivity of p-polarized light with increasing angle of incidence. Such an approach does not resolve factor (2). In some cases, factor (2) can be resolved by simply adding more microlayers to the MOF design to extend the ORU thickness gradient so that the normal incidence long wavelength band edge of the reflection band is pushed farther out into the near infrared wavelength range, and so that the long wavelength band edge at the maximum anticipated oblique incidence angle falls at or near the visual red limit (e.g. in a range from 650-750 nm) so that high reflectivity is maintained over the entire wavelength range of interest.

In many cases, however, factor (2) cannot be resolved simply by adding more microlayers (and more ORUs) to the stack to extend the reflection band. Such cases may arise in embodiments that attempt to combine the MOF mirror film with one or more scattering layers that are optically coupled to the MOF in such a way as to allow extreme levels of supercritical light to propagate through the MOF. In such cases, the highly oblique propagation angle of the supercritical light may be so great that the "blue-shifted" reflection band allows some light within the wavelength range of interest (e.g., red and yellow wavelengths within the visible wavelength range), or even substantially all light within the wavelength range of interest (e.g. all visible wavelengths) to propagate entirely through the MOF. Light that propagates through the MOF mirror film in this way can theoretically reflect off of the back or rear major surface of the MOF, provided that surface is smooth, clean, and exposed to air, but dirt, oils, adhesives, scratches, and/or other lossy components or features can result in the light being absorbed or otherwise lost at that surface, thus detracting from the overall reflectivity and from the overall efficiency of the mirror construction.

Semi-Specular Mirror Film Constructions

Figure 4A:
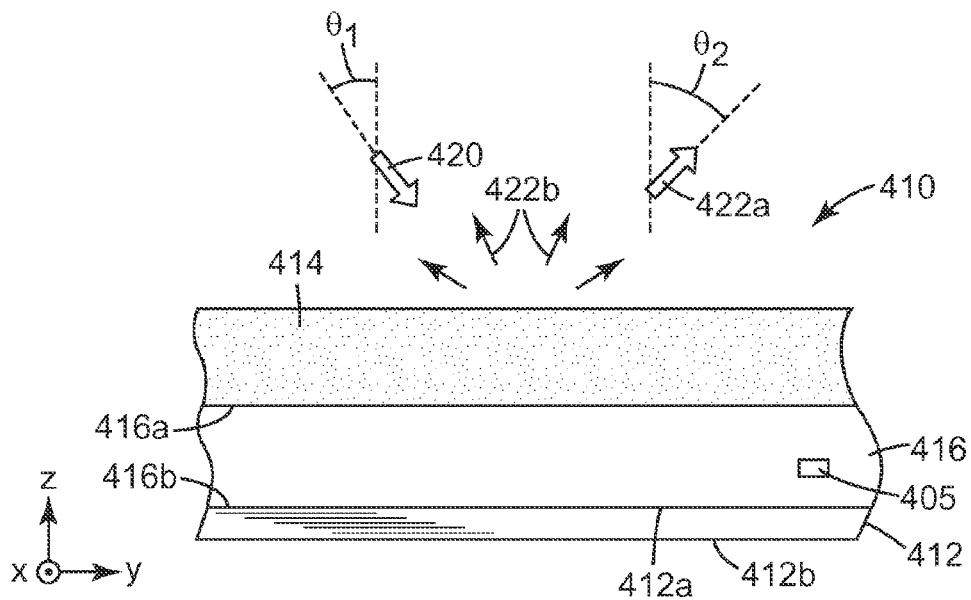
FIG. 4a is a schematic side or sectional view of a semi-specular mirror film that incorporates a nanovoided TIR layer and a wide band MOF mirror film.
Figure 4B:
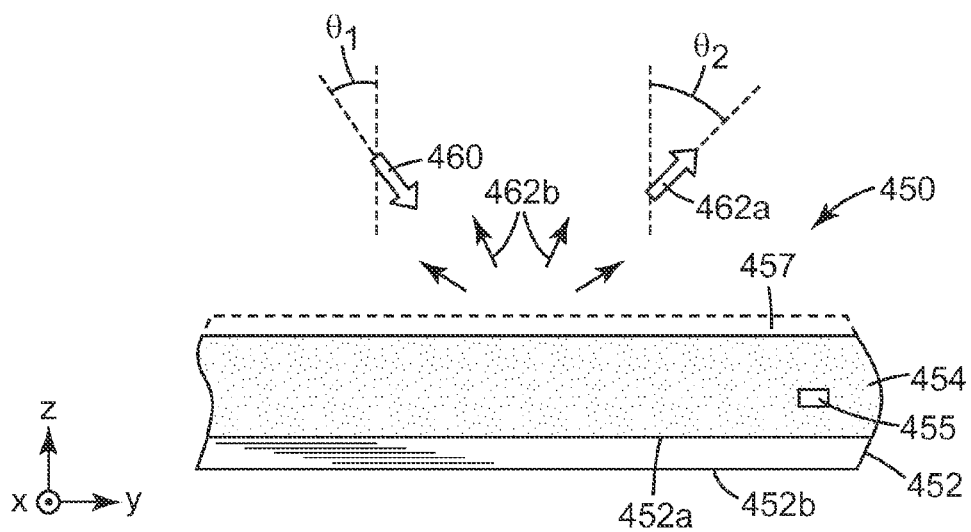
FIG. 4b is a schematic side or sectional view of a semi-specular mirror film that incorporates a nanovoided scattering layer and a wide band MOF mirror film.

To resolve such issues, we turn to one or both of the semispecular mirror designs shown in FIGS. 4a and 4b.

In FIG. 4a, a semi-specular mirror film 410 incorporates a specularly reflective wide band MOF mirror film 412, a scattering layer 414, and a nanovoided TIR layer 416. The scattering layer 414 has a rear surface that is coincident with a front surface 416a of the TIR layer 416, and the TIR layer 416 has a rear surface 416b that is coincident with a front surface 412a of the mirror film 412. A rear surface 412b of the mirror film 412 is also the rear surface of the semi-specular mirror film 410.

A light beam 420 is shown to be incident on the front surface of the film 410 at an angle of incidence $\theta_1$. This light may have a narrow wavelength band in the wavelength range of interest, or it may be broadband, e.g., covering the entire wavelength range of interest such as the visible spectrum. A portion of this light is specularly reflected to provide specularly reflected light 422a, e.g., by passing through layers 414, 416, being reflected by MOF mirror film 412, and passing back through layers 416, 414. The specularly reflected light 422a is reflected at an angle $\theta_2=\theta_1$. Substantially the remaining portion of the incident light is reflected diffusely over substantially the entire hemisphere of solid angle that defines the space in front of (rather than behind) the film 410. This scattered light is represented in the figure by scattered light rays 422b. The semi-specular mirror film 410 is advantageously designed not only to have high overall reflectivity and low loss, but also such that little or none of the incident light reaches the back surface 412b of the MOF mirror film 412, since dirt or other lossy components or features on that surface may detract from the overall reflectivity of the film semi-specular film 410.

This design goal is achieved in the following way. The scattering layer 414 scatters incident light in all directions within the layer. The scattered light includes a first portion that, if coupled into the MOF film 412, can be substantially reflected by the broad reflection band, e.g., with a reflectivity of at least 80, 85, 90, or 95% or more. The scattered light also includes a second portion that, if coupled into the MOF film 412, cannot be substantially reflected by the broad reflection band, e.g., it may have a reflectivity of less than 95, 90, 85, 80, 70, 60, or 50%. The second portion of the scattered light is associated with propagation directions within the scattering layer 414 that are more oblique than those of the first portion of the scattered light. The semi-specular mirror film 410 advantageously incorporates the TIR layer 416 between the scattering layer 414 and the MOF film 412 in order to block the second portion of the scattered light from reaching the MOF film 412. The TIR layer is composed of a material whose refractive index is greater than that of air (about 1.0) but tailored to be low enough so that the second portion of the scattered light is substantially all reflected at the interface 416*a* between the scattering layer and the TIR layer 416. At the same time, the refractive index of the TIR layer is high enough so that the first portion of the scattered light is not totally internally reflected at the interface 416*a*, but propagates through the TIR layer 416 and is reflected by the (blue-shifted) reflection band of the MOF mirror film 412. The TIR layer has a nanovoided morphology and includes a polymer binder and also preferably a plurality of particles, as discussed further below.

The TIR layer 416 may have a refractive index of less than 1.3 or less than 1.25, or less than 1.2, for example, but greater than 1 or greater than 1.1. Moreover, it may have a void volume fraction of at least 30%, 40%, 50%, or 60%. If particles are included in the TIR layer, the particles may comprise silicon dioxide or other suitable materials. A weight ratio of the particles in the TIR layer to the polymer binder in the TIR layer may be at least 1, or at least 2, or at least 4, or at least 6, or at least 7.

The broad reflection band of the MOF mirror film 412 may have, for normally incident light, a long wavelength band edge disposed at a wavelength no greater than 1600 nm, or no greater than 1400 nm, or no greater than 1200 nm, or no greater than 1000 nm, and a short wavelength band edge, for normally incident light, at a wavelength at or near 400 nm, e.g., in a range from 350-400 nm. Such an MOF mirror film, when incorporated into a semi-specular reflective film construction such as that of FIG. 4*a*, may provide a total hemispheric reflectivity for visible light of at least 97% when the rear surface of the MOF mirror film is in contact with an absorbing material, and may provide a degree of scattering for visible light corresponding to a transport ratio of less than 80%, or less than 60%, or less than 40%.

An alternative semi-specular mirror design is shown in FIG. 4*b*. In that figure, a semi-specular mirror film 450 incorporates a specularly reflective wide band MOF mirror film 452 and a nanovoided scattering layer 454. The mirror film 452 may be the same as or similar to the MOF mirror film 412 of FIG. 4*a*. The scattering layer 454 has a nano-voided morphology as described further below. A rear surface of the scattering layer 454 is coincident with a front surface 452*a* of the MOF mirror film 452, and a rear surface 452*b* of the mirror film 452 is also the rear surface of the semi-specular mirror film 450. An optional sealing layer 457 may be provided on the exposed major surface of the nanovoided scattering layer 454 in order to seal off the nanovoided layer and prevent liquid, gaseous, or molten substances from penetrating into the nanovoided layer.

A light beam 460 is shown to be incident on the front surface of the film 450 at an angle of incidence $\theta_1$. This light may have a narrow wavelength band in the wavelength range of interest, or it may be broadband, e.g., covering the entire wavelength range of interest such as the visible spectrum. A portion of this light is specularly reflected to provide specularly reflected light 462*a*, e.g., by passing through layer 454, being reflected by MOF mirror film 452, and passing back through layer 454. The specularly reflected light 462*a* is reflected at an angle $\theta_2=\theta_1$. Substantially the remaining portion of the incident light is reflected diffusely over substantially the entire hemisphere of solid angle that defines the space in front of (rather than behind) the film 450. This scattered light is represented in the figure by scattered light rays 462*b*. Like the semi-specular mirror film of FIG. 4*a*, the semi-specular mirror film 450 is also advantageously designed not only to have high overall reflectivity and low loss, but also such that little or none of the incident light reaches the back surface 452*b* of the MOF mirror film 452, since dirt or other lossy components or features on that surface may detract from the overall reflectivity of the film semi-specular film 450.

This design goal is achieved in the following way. The scattering layer 454 is tailored to scatter light into the MOF mirror film over a range of angles such that the scattered light can be substantially reflected by the broad reflection band. In order to accomplish this, the scattering layer 454 may have a nanovoided morphology and comprise a polymer binder, and it preferably also comprises a plurality of particles, as discussed further below.

The scattering layer may have a void volume fraction of at least 40%, 50%, or 60%. In cases where the scattering layer includes a plurality of particles, the particles may comprise silicon dioxide. The particles in the scattering layer may also be characterized by a size distribution that includes small particles, aggregates, and agglomerates of the small particles. A weight ratio of particles in the scattering layer to polymer binder in the scattering layer may be at least 1, or at least 2, or at least 4, or at least 6, or at least 7.

The nanovoided scattering layer may be characterized by a scattering distribution into a substrate of refractive index "$n_s$" when illuminated by a normally incident beam of visible light, wherein "$n_s$" is a minimum refractive index of the plurality of microlayers in the MOF mirror film. In some cases, the nanovoided scattering layer may be tailored to provide a scattering distribution that is not uniform as a function of scattering direction. The scattering distribution may advantageously be substantially reduced at grazing angles in the substrate, such that little or no highly oblique scattered light is produced that would propagate to the back surface of the MOF mirror film. For example, the scattering distribution of the nanovoided scattering layer 454 may have a value $S_0$ at a scattering angle (i.e., deviation angle within the substrate relative to the normally incident beam) of 0 degrees and a value $S_{60}$ at a scattering angle of 60 degrees, and $S_{60}$ may be less than 10% of $S_0$. The scattering distribution may also have a value $S_{70}$ at a scattering angle of 70 degrees, and $S_{70}$ may similarly be less than 10% of $S_0$. The scattering distribution may have a value $S_{50}$ at a scattering angle of 50 degrees, and $S_{50}$ may also be less than 10% of $S_0$.

In some cases it may be difficult to measure or quantify the refractive index of the nanovoided scattering layer 454, particularly when the degree of scattering or haze is high. The high scattering may, for example, make it difficult to detect with any precision a reflected beam when such a layer is subjected to the so-called prism coupling method of refractive index measurement. Thus, in some cases, depending on the amount of scattering provided by the nanovoided scattering layer, it may not be possible to characterize such a layer in terms of an index of refraction.

The broad reflection band of the MOF mirror film 452 may have, for normally incident light, a long wavelength band edge disposed at a wavelength no greater than 1600 nm, or no greater than 1400 nm, or no greater than 1200 nm, or no greater than 1000 nm, and a short wavelength band edge, for normally incident light, at a wavelength at or near 400 nm, e.g., in a range from 350-400 nm. Such an MOF mirror film, when incorporated into a semi-specular reflective film construction such as that of FIG. 4b, may provide a total hemispheric reflectivity for visible light of at least 97% when the rear surface of the MOF mirror film is in contact with an absorbing material, and may provide a degree of scattering for visible light corresponding to a transport ratio of less than 80%, or less than 60%, or less than 40%.

Nanovoided Layers

Some embodiments of the semi-specular mirror films of the present disclosure include one or more low refractive index layers that include a plurality of voids dispersed in a binder. The voids have an index of refraction $n_v$ and a permittivity $\epsilon_v$, where $n_v^2 = \epsilon_v$, and the binder has an index of refraction $n_b$ and a permittivity $\epsilon_b$, where $n_b^2 = \epsilon_b$. In general, the interaction of a low refractive index layer with light, such as light that is incident on, or propagates in, the low refractive index layer, depends on a number of film or layer characteristics such as, for example, the film or layer thickness, the binder index, the void or pore index, the pore shape and size, the spatial distribution of the pores, and the wavelength of light. In some embodiments, light that is incident on or propagates within the low refractive index layer, "sees" or "experiences" an effective permittivity $\epsilon_{eff}$ and an effective index $n_{eff}$, where $n_{eff}$ can be expressed in terms of the void index $n_v$, the binder index $n_b$, and the void porosity or volume fraction "f". In such embodiments, the low refractive index layer is sufficiently thick and the voids are sufficiently small so that light cannot resolve the shape and features of a single or isolated void. In such embodiments, the size of at least a majority of the voids, such as at least 60% or 70% or 80% or 90% of the voids, is not greater than about $\lambda/5$, or not greater than about $\lambda/6$, or not greater than about $\lambda/8$, or not greater than about $\lambda/10$, or not greater than about $\lambda/20$, where $\lambda$ is the wavelength of light. In some embodiments, some of the voids can be sufficiently small so that their primary optical effect is to reduce the effective index, while some other voids can reduce the effective index and scatter light, while still some other voids can be sufficiently large so that their primary optical effect is to scatter light.

In some embodiments, the light that is incident on the low refractive index layer is visible light, meaning that the wavelength of the light is in the visible range of the electromagnetic spectrum. In such embodiments, the visible light has a wavelength that is in a range of from about 380 nm to about 750 nm, or from about 400 nm to about 700 nm, or from about 420 nm to about 680 nm. In such embodiments, the low refractive index layer has an effective index of refraction and includes a plurality of voids if the size of at least a majority of the voids, such as at least 60% or 70% or 80% or 90% of the voids, is not greater than about 70 nm, or not greater than about 60 nm, or not greater than about 50 nm, or not greater than about 40 nm, or not greater than about 30 nm, or not greater than about 20 nm, or not greater than about 10 nm.

In some embodiments, the low refractive index layer is sufficiently thick so that the low refractive index layer has an effective index that can be expressed in terms of the indices of refraction of the voids and the binder, and the void or pore volume fraction or porosity. In such embodiments, the thickness of the low refractive index layer is not less than about 1 micrometer, or not less than about 2 micrometers, or in a range from 1 to 20 micrometers.

When the voids in a disclosed low refractive index layer are sufficiently small and the low refractive index layer is sufficiently thick, the low refractive index layer has an effective permittivity $\epsilon_{eff}$ that can be expressed as:

$$\epsilon_{eff} = f\epsilon_v + (1-f)\epsilon_b \tag{1}$$

In such embodiments, the effective index $n_{eff}$ of the optical film or low refractive index layer can be expressed as:

$$n_{eff}^2 = fn_v^2 + (1-f)n_b^2 \tag{2}$$

In some embodiments, such as when the difference between the indices of refraction of the pores and the binder is sufficiently small, the effective index of the low refractive index layer can be approximated by the following expression:

$$n_{eff} = fn_v + (1-f)n_b \tag{3}$$

In such embodiments, the effective index of the low refractive index layer is the volume weighted average of the indices of refraction of the voids and the binder. Under ambient conditions, the voids contain air, and thus the refractive index $n_v$ for the voids is approximately 1.00. For example, a low refractive index layer that has a void volume fraction of about 50% and a binder that has an index of refraction of about 1.5, has an effective index of about 1.25.

In some embodiments, the effective index of refraction of low refractive index layer is not greater than (or is less than) about 1.3, or less than about 1.25, or less than about 1.23, or less than about 1.2, or less than about 1.15. In some embodiments, the refractive index is between about 1.14 and about 1.30. In some embodiments, low refractive index layer includes a binder, a plurality of particles, and a plurality of interconnected voids or a network of interconnected voids.

A plurality of interconnected voids or a network of interconnected voids can occur in a number of methods. In one process, the inherent porosity of highly structured, high surface area fumed metal oxides, such as fumed silica oxides, is exploited in a mixture of binder to form a composite structure that combines binder, particles, voids and optionally crosslinkers or other adjuvant materials. The desirable binder to particle ratio is dependent upon the type of process used to form the interconnected voided structure.

While a binder resin is not a prerequisite for the porous fumed silica structure to form, it is typically desirable to incorporate some type of polymeric resin or binder in with the metal oxide network to improve the processing, coating quality, adhesion and durability of the final construction. Examples of useful binder resins are those derived from thermosetting, thermoplastic and UV curable polymers. Examples include polyvinylalcohol, (PVA), polyvinylbutyral (PVB), polyvinyl pyrrolidone (PVP), polyethylene vinyl acetate copolymers (EVA), cellulose acetate butyrate (CAB) polyurethanes (PURs), polymethylmethacrylate (PMMA), polyacrylates, epoxies, silicones and fluoropolymers. The binders could be soluble in an appropriate solvent such as water, ethyl acetate, acetone, 2-butone, and the like, or they could be used as dispersions or emulsions. Examples of some commercially available binders useful in the mixtures are those available from Kuraray-USA, Wacker Chemical, Dyneon LLC, and Rohm and Haas. Although the binder can be a polymeric system, it can also be added as a polymerizable monomeric system, such as a UV, or thermally curable or crosslinkable system. Examples of such systems would be UV polymerizable acrylates, methacrylates, multi-functional acrylates, urethane-acrylates, and mixtures thereof. Some typical examples would be 1,6-hexane diol diacrylate, trimethylol propane triacrylates, pentaerythritol triacrylate. Actinic radiation such as E-beam and UV active systems are well known and are readily available from such suppliers as Neo Res (Newark, Del.), Arkema (Philadelphia, Pa.), or Sartomer (Exton, Pa.). Other useful binder systems are cationically polymerizable systems such as vinyl ethers and epoxides.

The polymeric binders can also be formulated with cross linkers that can chemically bond with the polymeric binder to form a crosslinked network. Although the formation of crosslinks is not a prerequisite for the formation of the porous structure or the low refractive index optical properties, it is often desirable for other functional reasons such as to improve the cohesive strength of the coating, adhesion to the substrate or moisture, thermal and solvent resistance. The specific type of crosslinker is dependent upon the binder used. Typical crosslinkers for polymeric binders such as PVA would be diisocyanates, titanates such as TYZOR-LA™ (available from DuPont, Wilmington, Del.), poly(epichlorohydrin)amide adducts such as PolyCup 172, (available from Hercules, Wilmington, Del.), multi-functional aziridines such as CX100 (available from Neo-Res, Newark, Del.) and boric acid, diepoxides diacids and the like.

The polymeric binders may form a separate phase with the particle aggregates or may be inter-dispersed between the particle aggregates in a manner to "bind" the aggregates together into a structures connecting with the metal oxidize particles through direct covalent bond formation or molecular interactions such as ionic, dipole, van der Waals forces, hydrogen bonding and physical entanglements with the metal oxides.

Exemplary particles include fumed metal oxides or pyrogenic metal oxides, such as, for example, a fumed silica or alumina. In some embodiments, particles that are highly branched or structured may be used. Such particles prevent efficient packing in the binder matrix and allow interstitial voids or pores to form. Exemplary materials including highly branched or structured particles include Cabo-Sil™ fumed silicas or silica dispersions, such as, for example, those sold under trade designations TS 520, or pre-dispersed fumed silica particles such as those available as Cabo-Sperse™ PG 001, PG 002, 1020K, 1015. Fumed alumina oxides are also useful structured particles to form a low refractive index system although silica is preferred since it has an inherent by lower skeletal refractive index than alumina. Examples of alumina oxide are available under the trade name Cabo-Sperse, such as, for example, those sold under the trade designation Cabo-Sperse™ PG003 or Cabot Spec-Al™.

Figure 5A:
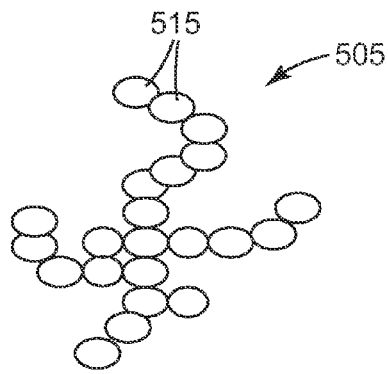
FIG. 5a is a schematic view of primary particles organized into an aggregate particle.
Figure 5B:
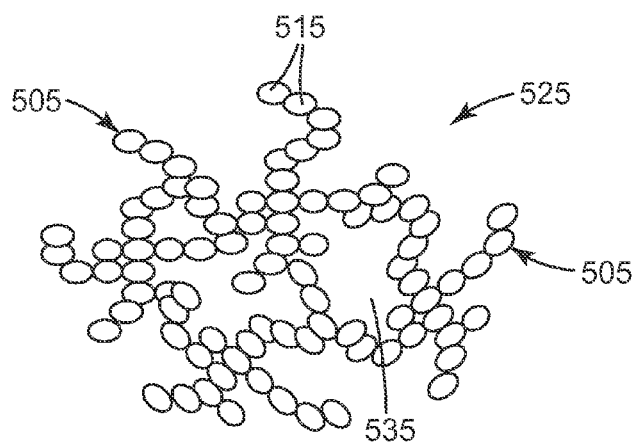
FIG. 5b is a schematic view of aggregate particles organized into an agglomerate having a mesoporous structure.

Referring now to FIG. 5a, in some embodiments, aggregates 505 of these exemplary fumed metal oxides comprise a plurality of primary particles 515 in the range of about 8 nm to about 20 nm and form a highly branched structure with a wide distribution of sizes ranging from about 80 nm to greater than 300 nm. Referring now to FIG. 5b, in some embodiments, these aggregates 505 of primary particles 515 pack randomly in a unit volume of a coating to form agglomerates having a mesoporous structure 525 with complex bi-continuous network of channels, tunnels, and pores 535 which entrap air in the network and thus lower the density and refractive index of the coating. Other useful porous materials are derived from naturally occurring inorganic materials such as clays, barium sulfates, aluminum, silicates and the like. The low refractive index layer has an effective refractive index of 1.23 or less when the metal oxide is silica oxide and 1.33 or less then the metal oxide is alumina oxide.

Figure 5C:
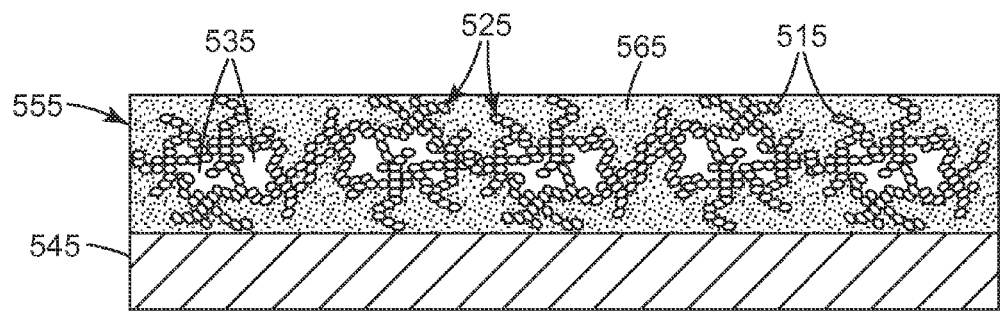
FIG. 5c is a schematic side or sectional view of a semi-specular mirror film that incorporates a mesoporous structure and a binder.

Referring now to FIG. 5c, in some embodiments, primary particles 515, aggregates 505, and agglomerates having a mesoporous structure 525 are combined with binder 565 and deposited as a TIR layer 555 on a substrate 545. In some embodiments, the binder 565 does not fill the bi-continuous network of channels, tunnels, and pores 535, which results in the TIR layer 555 being a nanovoided layer. Depending on details of composition and structure, the nanovoided TIR layer 555 may represent the layer 416 in FIG. 4a, and/or the layer 454 in FIG. 4b.

Fumed silica particles can also be treated with a surface treatment agent. Surface-treatment of the metal oxide particles can provide, for example, improved dispersion in the polymeric binder, altered surface properties, enhanced particle-binder interactions, and/or reactivity. In some embodiments, the surface-treatment stabilizes the particles so that the particles are well dispersed in the binder, resulting in a substantially more homogeneous composition. The incorporation of surface modified inorganic particles can be tailored, for example, to enhance covalent bonding of the particles to the binder and to thereby provide a more durable and more homogeneous polymer/particle network.

The preferred type of treatment agent is determined, in part, by the chemical nature of the metal oxide surface. Silanes are preferred for silica and other for siliceous fillers. In the case of silanes, it may be preferred to react the silanes with the particle surface before incorporation into the binder. The required amount of surface modifier is dependant upon several factors such as, for example, particle size, particle type, modifier molecular weight, and/or modifier type. The silane modifier can have reactive groups that form covalent bonds between particles and the binder such as, for example, carboxy, alcohol, isocyanate, acryloxy, epoxy, thiol or amines. Conversely, the silane modifier can have non-reactive groups, such as, for example, alkyl, alkloxy, phenyl, phenyloxy, polyethers, or mixtures thereof. Such non-reactive groups may modify the surface of the coatings to improve, for example, soil and dirt resistance or to improve static dissipation. Commercially available examples of a surface modified silica particle include, for example, Cabo-Sil™ TS 720 and TS 530. It may sometimes be desirable to incorporate a mixture of functional and non-function groups on the surface of the particles to obtain a combination of these desirable features.

Representative embodiments of surface treatment agents suitable for use in the compositions of the present disclosure include, for example, N-(3-triethoxysilylpropyl)methoxyethoxyethoxyethyl carbamate, N-(3-triethoxysilylpropyl) methoxyethoxyethoxyethyl carbamate, 3-(methacryloyloxy) propyltrimethoxysilane, 3-acryloxypropyltrimethoxysilane, 3-(methacryloyloxy)propyltriethoxysilane, 3-(methacryloyloxy)propylmethyldimethoxysilane, 3-(acryloyloxypropyl)methyldimethoxysilane, 3-(methacryloyloxy)propyldimethylethoxysilane, 3-(methacryloyloxy)propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate (BCEA), 2-(2-methoxyethoxy)acetic acid, methoxyphenyl acetic acid, and mixtures thereof.

Particle volume concentration (PVC) and critical particle volume concentration (CPVC) can be used to characterize the porosity of a coating. The terms PVC and CPVC are well defined terms in the paint and pigment literature and are further defined well referenced articles and technical books, such as, for example "*Paint Flow and Pigment Dispersion*", Patton, T. C., $2^{nd}$ Edition, J. Wiley Interscience, 1978, Chapter 5, p. 126 and "*Modeling Cluster Voids and Pigment Distribution to Predict Properties and CPVC in Coatings. Part 1: Dry Coating Analysis*" and Sudduth, R. D; *Pigment and Resin Technology,* 2008, 37(6). p. 375.) When the volume concentration of the particles is larger than CPVC, the coating is porous since there is not enough binder to fill all the gaps between the particles and the interstitial regions of the coating. The coating then becomes a mixture of binder, particles, and voids. The volume concentration at which this occurs is related to particle size and particle structure and/or shape. Formulations with volume concentrations above CPVC have a volume deficiency of resin in the mixture that is replaced by air. The relationship between CPVC, PVC and porosity is:

$$\text{Porosity} = 1 - \frac{CPVC}{PVC}$$

As used in this discussion of CPVC, the term "pigment" is equivalent to particles and the term "resin" is equivalent to binder. In certain binder-particle systems, when the volume concentration of the particles exceeds a critical value known, as the CPVC, the mixture becomes porous. Thus the coating becomes essentially a mixture of binder, particles, and air, because there is insufficient binder to fill all the gaps between the particles and the interstitial regions of the coating. When this occurs, the volume concentration is related to at least one of the pigment particle size distribution, wetting, and the particle structure or shape. Materials that provide desired low refractive index properties have submicron pores derived from particle-binder mixtures that are highly structured and formulated above their CPVC. In some embodiments, optical articles have CPVC values that are not greater than (or are less than) about 60%, or less than about 50%, or less than about 40%.

As described above, particles that are highly branched or structured prevent efficient packing in the binder matrix and allow interstitial voids or pores to form. In contrast, material combinations which fall below the desired CPVC will not be sufficiently porous. The BET method (described above) may be helpful in determining CPVC and thus porosity of low index materials because the BET method analyzes pores which are less than 200 nm in diameter, less than 100 nm in diameter, or even less than 10 nm in diameter. BET data can assist in the characterization of materials that meet minimum requirements for forming a porous structure.

The volume concentration of the particles described by the PVC/CPVC relationship is also related to the weight concentration of the particles. Therefore it is possible to establish particle weight ranges that are above the CPVC. The use of weight ratio or weight percent is one way to formulate mixtures with the desirable CPVC values. For the optical constructions of the present disclosure, weight ratios of binder to particle from 1:1 to 1:10 are desirable. A weight ratio of 1:1 is the equivalent of about 50 wt % particle where as 1:8 is equivalent to about 89 wt % particle. Exemplary binder to metal oxide particle ratios are less than 1:2 (less than 33% binder), less than 1:3, less than 1:4, less than 1:5, less than 1:6, less than 1:7, less than 1:8, less than 1:9, and less than 1:10 (about 8-10% binder). The lower limit of binder may be dictated by the desired refractive index. The lower limit of binder may be dictated by the desired physical properties, e.g., processing or final durability characteristics. Thus the binder to particle ratio will vary depending on the desired end use and the desired optical article properties.

In general, low refractive index layer can have any porosity, pore-size distribution, or void volume fraction that may be desirable in an application. In some embodiments, the volume fraction of plurality of the voids in the low refractive index layer is not less than about 20%, or not less than about 30%, or not less than about 40%, or not less than about 50%, or not less than about 60%, or not less than about 70%, or not less than about 80%, or not less than about 90%.

In some embodiments, some of the particles have reactive groups and others do not have reactive groups. For example in some embodiments, about 10% of the particles have reactive groups and about 90% of the particles do not have reactive groups, or about 15% of the particles have reactive groups and about 85% of the particles do not have reactive groups, or about 20% of the particles have reactive groups and about 80% of the particles do not have reactive groups, or about 25% of the particles have reactive groups and about 75% of the particles do not have reactive groups, or about 30% of the particles have reactive groups and about 60% of the particles do not have reactive groups, or about 35% of the particles have reactive groups and about 65% of the particles do not have reactive groups, or about 40% of the particles have reactive groups and about 60% of the particles do not have reactive groups, or about 45% of the particles have reactive groups and about 55% of the particles do not have reactive groups, or about 50% of the particles have reactive groups and about 50% of the particles do not have reactive groups. In some embodiments, some of the particles may be functionalized with both reactive and unreactive groups on the same particle.

The ensemble of particles may include a mixture of sizes, reactive and non-reactive particles and different types of particles, for example, organic particles including polymeric particles such as acrylics, polycarbonates, polystyrenes, silicones and the like; or inorganic particles such as glasses or ceramics including, for example, silica and zirconium oxide, and the like.

In some embodiments, the low refractive index layers or material has a BET porosity that is greater than about 40% (which corresponds to a surface area of about 50 m$^2$/g as determined by the BET method), porosity greater than about 50% (which corresponds to a surface area of about 65-70 m$^2$/g as determined by the BET method), greater than about 60% (which corresponds to a surface area of about 80-90 m$^2$/g as determined by the BET method), and most preferably between about 65% and about 80% (which corresponds to a somewhat higher surface area of values greater than about 100 m$^2$/g as determined by the BET method). In some embodiments, the volume fraction of the plurality of interconnected voids in the low refractive index layer is not less than (or is greater than) about 20%, or greater than about 30%, or greater than about 40%, or greater than about 50%, or greater than about 60%, or greater than about 70%, or greater than about 90%. Generally it can be shown higher surface areas indicated higher percent porosity and thus lower refractive index, but the relationship between these parameters is complicated. The values shown here are only for purposes of guidance and not meant to exemplify a limiting correlation between these properties. The BET surface area and percent porosity values will be dictated by the need to balance the low refractive index and other critical performance properties such as cohesive strength of the coating. As used herein, the term "BET method" refers to the Braunauer, Emmett, and Teller surface area analysis (See S. Brunauer, P. H. Emmett and E. Teller, J. Am. Chem. Soc., 1938, 60, 309). The BET method is a well-known method used to determine pore size, surface area, and percent porosity of a solid substance. BET theory relates to the physical adsorption of gas molecules on a solid surface and serves as the basis for obtaining physical information about the surface area and porosity of a solid surface.

There are numerous coating techniques known in the art useful to make the embodiments described herein. The more common techniques are, but not limited to, well known roll-to-roll automated processes such as knife bar, slot die, slide, curtain, roll and Gravure coating techniques. It is also possible to coat these solutions using non-continuous methods such as inkjet, screen, offset printing, dip and spray coating techniques. While the exact coating technique is not critical to obtain the low refractive index properties some techniques enable multiple layers to be coated onto the substrate simultaneously and this improves the economics of the coating process. The desired final application will dictate which technique is preferred.

Figure 5D:
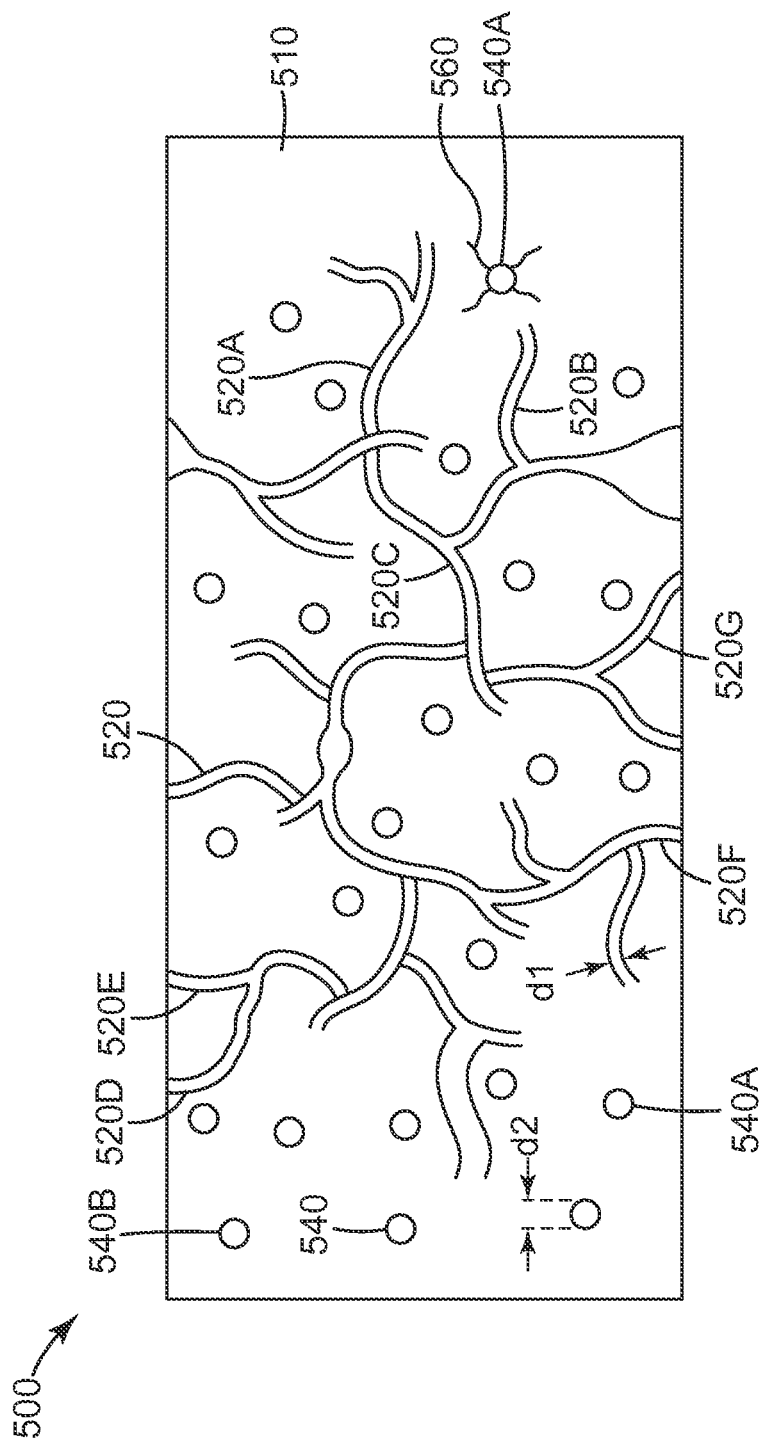
FIG. 5d is an enlarged schematic view of a portion of a nanovoided layer suitable for use in the mirror films of FIGS. 4a and 4b.

FIG. 5d is an enlarged schematic view of a portion of an alternative nanovoided layer 500 suitable for use in the semi-specular mirror film constructions of FIGS. 4a and 4b. For example, the nanovoided layer portion 500 may represent the volume portion 405 of layer 416 in FIG. 4a, and/or the volume portion 455 of layer 454 in FIG. 4b.

Exemplary nanovoided layers 500 include a plurality of interconnected voids or a network of voids 520 dispersed in a binder 510. At least some of the voids in the plurality or network are connected to one another via hollow tunnels or hollow tunnel-like passages. The interconnected voids may be the remnant of an interconnected mass of solvent that formed part of an originally coated film, and that was driven out of the film by the oven or other means after curing of the polymerizable material. Further details of construction and fabrication can be found in commonly assigned U.S. patent application Ser. No. 61/294,610, filed Jan. 13, 2010. The network of voids 520 can be regarded to include interconnected voids or pores 520A-520C as shown in FIG. 5. The voids are not necessarily free of all matter and/or particulates. For example, in some cases, a void may include one or more small fiber- or string-like objects that include, for example, a binder and/or nanoparticles. Some disclosed nanovoided layers may include multiple sets of interconnected voids or multiple networks of voids where the voids in each set or network are interconnected. In some cases, in addition to multiple pluralities or sets of interconnected voids, the nanovoided layer may also include a plurality of closed or unconnected voids, meaning that the voids are not connected to other voids via tunnels. In cases where a network of voids 520 forms one or more passages that extend from a first major surface to an opposed second major surface of the nanovoided layer 500, the layer 500 may be described as being a porous layer.

Some of the voids can reside at or interrupt a surface of the nanovoided microstructured layer and can be considered to be surface voids. For example, if the upper and lower bounds of the volume 500, as shown in FIG. 5, represent opposed major surfaces of a nanovoided layer, the voids 520D and 520E would reside at one major surface of the nanovoided layer and could be regarded as surface voids 520D and 520E, and voids 520F and 520G would reside at the opposite major surface of the nanovoided layer and could be regarded as surface voids 520F and 520G. Some of the voids, such as voids 520B and 520C, are disposed within the interior of the nanovoided layer and away from the exterior surfaces, and can thus be regarded as interior voids 520B and 520C even though an interior void may be connected to a major surface via one or more other voids.

Voids 520 have a size d1 that can generally be controlled by choosing suitable composition and fabrication, such as coating, drying, and curing conditions. In general, d1 can be any desired value in any desired range of values. For example, in some cases, at least a majority of the voids, such as at least 60% or 70% or 80% or 90% or 95% of the voids, have a size that is in a desired range. For example, in some cases, at least a majority of the voids, such as at least 60% or 70% or 80% or 90% or 95% of the voids, have a size that is not greater than about 10 micrometers, or not greater than about 7, or 5, or 4, or 3, or 2, or 1, or 0.7, or 0.5 micrometers.

In some cases, a plurality of interconnected voids 520 has an average void or pore size that is not greater than about 5 micrometers, or not greater than about 4 micrometers, or not greater than about 3 micrometers, or not greater than about 2 micrometers, or not greater than about 1 micrometer, or not greater than about 0.7 micrometers, or not greater than about 0.5 micrometers.

In some cases, some of the voids can be sufficiently small so that their primary optical effect is to reduce the effective index, while some other voids can reduce the effective index and scatter light, while still some other voids can be sufficiently large so that their primary optical effect is to scatter light.

The nanovoided layer 500 may have any useful thickness (linear distance between opposed major surfaces of the layer). In many embodiments the nanovoided layer may have a thickness that is not less than about 100 nm, or not less than about 500 nm, or not less than about 1,000 nm, or in a range from 0.1 to 10 micrometers, or in a range from 1 to 100 micrometers.

In some cases, the nanovoided layer may be thick enough so that the nanovoided layer can reasonably have an effective refractive index that can be expressed in terms of the indices of refraction of the voids and the binder, and the void or pore volume fraction or porosity. In such cases, the thickness of the nanovoided layer is not less than about 500 nm, or not less than about 1,000 nm, or in a range from 1 to 10 micrometers, or in a range from 500 nm to 100 micrometers, for example.

When the voids in a disclosed nanovoided layers are sufficiently small and the nanovoided layer is sufficiently thick, the nanovoided layer has an effective permittivity $\in_{eff}$ that can be expressed as:

$$\in_{eff} = (f)\in_v + (1-f)\in_b, \quad (1)$$

where $\in_v$ and $\in_b$ are the permittivities of the voids and the binder respectively, and f is the volume fraction of the voids in the nanovoided layer. In such cases, the effective refractive index $n_{eff}$ of the nanovoided layer can be expressed as:

$$n_{eff}^2 = (f)n_v^2 + (1-f)n_b^2, \quad (2)$$

where $n_v$ and $n_b$ are the refractive indices of the voids and the binder respectively. In some cases, such as when the difference between the indices of refraction of the voids and the binder is sufficiently small, the effective index of the nanovoided layer can be approximated by the following expression:

$$n_{eff} \approx (f)n_v + (1-f)n_b, \quad (3)$$

In such cases, the effective index of the nanovoided layer is the volume weighted average of the indices of refraction of the voids and the binder. For example, a nanovoided layer that has a void volume fraction of 50% and a binder that has an index of refraction of 1.5 has an effective index of about 1.25 as calculated by equation (3), and an effective index of about 1.27 as calculated by the more precise equation (2). In some exemplary embodiments the nanovoided layer may have an effective refractive index in a range from 1.15 to 1.35. In some embodiments the nanovoided microstructured layer may have an effective refractive index in a range from 1.16 to 1.30.

The nanovoided layer 500 of FIG. 5d is also shown to include, in addition to the plurality of interconnected voids or network of voids 520 dispersed in the binder 510, an optional plurality of nanoparticles 540 dispersed substantially uniformly within the binder 510.

Nanoparticles 540 have a size d2 that can be any desired value in any desired range of values. For example, in some cases at least a majority of the particles, such as at least 60% or 70% or 80% or 90% or 95% of the particles, have a size that is in a desired range. For example, in some cases, at least a majority of the particles, such as at least 60% or 70% or 80% or 90% or 95% of the particles, have a size that is not greater than about 1 micrometer, or not greater than about 700, or 500, or 200, or 100, or 50 nanometers. In some cases, the plurality of nanoparticles 540 may have an average particle size that is not greater than about 1 micrometer, or not greater than about 700, or 500, or 200, or 100, or 50 nanometers.

In some cases, some of the nanoparticles can be sufficiently small so that they primarily affect the effective index, while some other nanoparticles can affect the effective index and scatter light, while still some other particles can be sufficiently large so that their primary optical effect is to scatter light.

The nanoparticles 540 may or may not be functionalized. In some cases, some, most, or substantially all of the nanoparticles 540, such as nanoparticle 540B, are not functionalized. In some cases, some, most, or substantially all of the nanoparticles 540 are functionalized or surface treated so that they can be dispersed in a desired solvent or binder 510 with no, or very little, clumping. In some embodiments, nanoparticles 540 can be further functionalized to chemically bond to binder 510. For example, nanoparticles such as nanoparticle 540A, can be surface modified or surface treated to have reactive functionalities or groups 560 to chemically bond to binder 510. Nanoparticles can be functionalized with multiple chemistries, as desired. In such cases, at least a significant fraction of nanoparticles 540A are chemically bound to the binder. In some cases, nanoparticles 540 do not have reactive functionalities to chemically bond to binder 510. In such cases, nanoparticles 540 can be physically bound to binder 510.

In some cases, some of the nanoparticles have reactive groups and others do not have reactive groups. An ensemble of nanoparticles can include a mixture of sizes, reactive and nonreactive particles, and different types of particles (e.g., silica and zirconium oxide). In some cases, the nanoparticles may include surface treated silica nanoparticles.

The nanoparticles may be inorganic nanoparticles, organic (e.g., polymeric) nanoparticles, or a combination of organic and inorganic nanoparticles. Furthermore, the nanoparticles may be porous particles, hollow particles, solid particles, or combinations thereof. Examples of suitable inorganic nanoparticles include silica and metal oxide nanoparticles including zirconia, titania, ceria, alumina, iron oxide, vanadia, antimony oxide, tin oxide, alumina/silica, and combinations thereof. The nanoparticles can have an average particle diameter less than about 1000 nm, or less than about 100 or 50 nm, or the average may be in a range from about 3 to 50 nm, or from about 3 to 35 nm, or from about 5 to 25 nm. If the nanoparticles are aggregated, the maximum cross sectional dimension of the aggregated particle can be within any of these ranges, and can also be greater than about 100 nm. In some embodiments, "fumed" nanoparticles, such as silica and alumina, with primary size less than about 50 nm, are also included, such as CAB-O-SPERSE® PG 002 fumed silica, CAB-O-SPERSE® 2017A fumed silica, and CAB-O-SPERSE® PG 003 fumed alumina, available from Cabot Co. Boston, Mass.

The nanoparticles may include surface groups selected from the group consisting of hydrophobic groups, hydrophilic groups, and combinations thereof. Alternatively, the nanoparticles may include surface groups derived from an agent selected from the group consisting of a silane, organic acid, organic base, and combinations thereof. In other embodiments, the nanoparticles include organosilyl surface groups derived from an agent selected from the group consisting of alkylsilane, arylsilane, alkoxysilane, and combinations thereof.

The term "surface-modified nanoparticle" refers to a particle that includes surface groups attached to the surface of the particle. The surface groups modify the character of the particle. The terms "particle diameter" and "particle size" refer to the maximum cross-sectional dimension of a particle. If the particle is present in the form of an aggregate, the terms "particle diameter" and "particle size" refer to the maximum cross-sectional dimension of the aggregate. In some cases, particles can be large aspect ratio aggregates of nanoparticles, such as fumed silica particles.

The surface-modified nanoparticles have surface groups that modify the solubility characteristics of the nanoparticles. The surface groups are generally selected to render the particle compatible with the coating solution. In some cases, the surface groups can be selected to associate or react with at least one component of the coating solution, to become a chemically bound part of the polymerized network.

A variety of methods are available for modifying the surface of nanoparticles including, e.g., adding a surface modifying agent to nanoparticles (e.g., in the form of a powder or a colloidal dispersion) and allowing the surface modifying agent to react with the nanoparticles. Other useful surface modification processes are described in, e.g., U.S. Pat. No. 2,801,185 (Iler) and U.S. Pat. No. 4,522,958 (Das et al.).

Useful surface-modified silica nanoparticles include silica nanoparticles surface-modified with silane surface modifying agents including, e.g., Silquest® silanes such as Silquest® A-1230 from GE Silicones, 3-acryloyloxypropyl trimethoxysilane, 3-methacryloyloxypropyltrimethoxysilane, 3-mercaptopropyltrimethoxysilane, noctyltrimethoxysilane, isooctyltrimethoxysilane, 4-(triethoxysilyl)-butyronitrile, (2-cyanoethyl)triethoxysilane, N-(3-triethoxysilylpropyl)methoxyethoxyethoxyethyl carbamate (PEG3TMS), N-(3-triethoxysilylpropyl)methoxyethoxyethoxyethyl carbamate (PEG2TMS), 3-(methacryloyloxy) propyltriethoxysilane, 3-(methacryloyloxy)propylmethyldimethoxysilane, 3-(acryloyloxypropyl) methyldimethoxysilane, 3-(methacryloyloxy) propyldimethylethoxysilane, 3-(methacryloyloxy) propyldimethylethoxysilane, vinyldimethylethoxysilane, phenyltrimethoxysilane, noctyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-tbutoxysilane, vinyltris-isobutoxysilane, vinyltriisopropenoxysilane, vinyltris(2-methoxyethoxy)silane, and combinations thereof. Silica nanoparticles can be treated with a number of surface modifying agents including, e.g., alcohol, organosilane including, e.g., alkyltrichlorosilanes, trialkoxyarylsilanes, trialkoxy(alkyl)silanes, and combinations thereof, and organotitanates and mixtures thereof.

The nanoparticles may be provided in the form of a colloidal dispersion. Examples of useful commercially available unmodified silica starting materials include nano-sized colloidal silicas available under the product designations NALCO 1040, 1050, 1060, 2326, 2327, and 2329 colloidal silica from Nalco Chemical Co., Naperville, Ill.; the organosilica under the product name IPA-ST-MS, IPA-ST-L, IPA-ST, IPA-ST-UP, MA-ST-M, and MA-ST sols from Nissan Chemical America Co. Houston, Tex. and the SnowTex® ST-40, ST-50, ST-20L, ST-C, ST-N, ST-O, ST-OL, ST-ZL, ST-UP, and ST-OUP, also from Nissan Chemical America Co. Houston, Tex. The weight ratio of polymerizable material to nanoparticles can range from about 30:70, 40:60, 50:50, 55:45, 60:40, 70:30, 80:20 or 90:10 or more. The preferred ranges of wt % of nanoparticles range from about 10% by weight to about 60% by weight, and can depend on the density and size of the nanoparticle used.

In some cases, the nanovoided microstructured layer 300 may have a low optical haze value. In such cases, the optical haze of the nanovoided microstructured layer may be no more than about 5%, or no greater than about 4, 3.5, 3, 2.5, 2, 1.5, or 1%. For light normally incident on nanovoided microstructured layer 300, "optical haze" may (unless otherwise indicated) refer to the ratio of the transmitted light that deviates from the normal direction by more than 4 degrees to the total transmitted light. Optical transmittance, clarity, and haze may be measured, for example, using a Haze-Gard Plus™ haze meter, or a Haze-Gloss™ meter, both available from BYK-Gardner, Silver Springs, Md. Alternative techniques for characterizing haze and scattering are discussed below.

In some cases, the nanovoided layer 500 may have a high optical haze. In such cases, the haze of the nanovoided microstructured layer 500 may be at least about 40%, or at least about 50, 60, 70, 80, 90, or 95%. In other cases, the nanovoided layer 500 can be made to have a small or insubstantial amount of haze or scattering.

In general, the nanovoided layer 500 can have any porosity or void volume fraction that may be desirable in an application. In some cases, the volume fraction of plurality of voids 520 in the nanovoided layer 500 is at least about 10%, or at least about 20, 30, 40, 50, 60, 70, 80, or 90%.

Binder 510 can be or include any material that may be desirable in an application. For example, binder 510 can be a light curable material that forms a polymer, such as a crosslinked polymer. In general, binder 510 can be any polymerizable material, such as a polymerizable material that is radiation-curable. In some embodiments binder 510 can be any polymerizable material, such as a polymerizable material that is thermally-curable.

Polymerizable material 510 can be any polymerizable material that can be polymerized by various conventional anionic, cationic, free radical or other polymerization technique, which can be chemically, thermally, or initiated with actinic radiation, e.g., processes using actinic radiation including, e.g., visible and ultraviolet light, electron beam radiation and combinations thereof, among other means. The media that polymerizations can be carried out in include, including, e.g., solvent polymerization, emulsion polymerization, suspension polymerization, bulk polymerization, and the like.

Actinic radiation curable materials include monomers, and reactive oligomers, and polymers of acrylates, methacrylates, urethanes, epoxies, and the like. Representative examples of actinic radiation curable groups suitable in the practice of the present disclosure include epoxy groups, ethylenically unsaturated groups such as (meth)acrylate groups, olefinic carboncarbon double bonds, allyloxy groups, alpha-methyl styrene groups, (meth)acrylamide groups, cyanoester groups, vinyl ethers groups, combinations of these, and the like. Free radically polymerizable groups are preferred. In some embodiments, exemplary materials include acrylate and methacrylate functional monomers, oligomers, and polymers, and in particular, multifunctional monomers that can form a crosslinked network upon polymerization can be used, as known in the art. The polymerizable materials can include any mixture of monomers, oligomers, and polymers; however the materials should be at least partially soluble in at least one solvent. In some embodiments, the materials should be soluble in the solvent monomer mixture. As used herein, the term "monomer" means a relatively low molecular weight material (i.e., having a molecular weight less than about 500 g/mole) having one or more polymerizable groups. "Oligomer" means a relatively intermediate molecular weight material having a molecular weight of from about 500 up to about 10,000 g/mole. "Polymer" means a relatively high molecular weight material having a molecular weight of at least about 10,000 g/mole, preferably at 10,000 to 100,000 g/mole. The term "molecular weight" as used throughout this specification means number average molecular weight, unless expressly noted otherwise.

Exemplary monomeric polymerizable materials include styrene, alpha-methylstyrene, substituted styrene, vinyl esters, vinyl ethers, N-vinyl-2-pyrrolidone, (meth)acrylamide, Nsubstituted (meth)acrylamide, octyl(meth)acrylate, iso-octyl(meth)acrylate, nonylphenol ethoxylate(meth)acrylate, isononyl(meth)acrylate, diethylene glycol(meth)acrylate, isobornyl(meth)acrylate, 2-(2-ethoxyethoxy)ethyl (meth)acrylate, 2-ethylhexyl(meth)acrylate, lauryl(meth) acrylate, butanediol mono(meth)acrylate, beta-carboxyethyl (meth)acrylate, isobutyl(meth)acrylate, cycloaliphatic epoxide, alpha-epoxide, 2-hydroxyethyl(meth)acrylate, (meth)acrylonitrile, maleic anhydride, itaconic acid, isodecyl(meth)acrylate, dodecyl(meth)acrylate, n-butyl(meth) acrylate, methyl(meth)acrylate, hexyl(meth)acrylate, (meth) acrylic acid, N-vinylcaprolactam, stearyl(meth)acrylate, hydroxyl functional polycaprolactone ester(meth)acrylate, hydroxyethyl(meth)acrylate, hydroxymethyl(meth)acrylate, hydroxypropyl(meth)acrylate, hydroxyisopropyl(meth) acrylate, hydroxybutyl(meth)acrylate, hydroxyisobutyl (meth)acrylate, tetrahydrofurfuryl(meth)acrylate, combinations of these, and the like.

Functional oligomers and polymers may also be collectively referred to herein as "higher molecular weight constituents or species." Suitable higher molecular weight constituents may be incorporated into compositions of the present disclosure. Such higher molecular weight constituents may provide benefits including viscosity control, reduced shrinkage upon curing, durability, flexibility, adhesion to porous and nonporous substrates, outdoor weatherability, and/or the like. The amount of oligomers and/or polymers incorporated into fluid compositions of the present disclosure may vary within a wide range depending upon such factors as the intended use of the resultant composition, the nature of the reactive diluent, the nature and weight average molecular weight of the oligomers and/or polymers, and the like. The oligomers and/or polymers themselves may be straight-chained, branched, and/or cyclic. Branched oligomers and/or polymers tend to have lower viscosity than straight-chain counterparts of comparable molecular weight.

Exemplary polymerizable oligomers or polymers include aliphatic polyurethanes, acrylics, polyesters, polyimides, polyamides, epoxy polymers, polystyrene (including copolymers of styrene) and substituted styrenes, silicone containing polymers, fluorinated polymers, combinations of these, and the like. For some applications, polyurethane and acrylate oligomers and/or polymers can have improved durability and weatherability characteristics. Such materials also tend to be readily soluble in reactive diluents formed from radiation curable, (meth)acrylate functional monomers.

Because aromatic constituents of oligomers and/or polymers generally tend to have poor weatherability and/or poor resistance to sunlight, aromatic constituents can be limited to less than 5 weight percent, preferably less than 1 weight percent, and can be substantially excluded from the oligomers and/or polymers and the reactive diluents of the present disclosure. Accordingly, straight-chained, branched and/or cyclic aliphatic and/or heterocyclic ingredients are preferred for forming oligomers and/or polymers to be used in outdoor applications.

Suitable radiation curable oligomers and/or polymers for use in the present disclosure include, but are not limited to, (meth)acrylated urethanes (i.e., urethane(meth)acrylates), (meth)acrylated epoxies (i.e., epoxy(meth)acrylates), (meth) acrylated polyesters (i.e., polyester(meth)acrylates), (meth) acrylated(meth)acrylics, (meth)acrylated silicones, (meth) acrylated polyethers (i.e., polyether(meth)acrylates), vinyl (meth)acrylates, and (meth)acrylated oils.

The solvent used during manufacture of the nanovoided layer can be any solvent that forms a solution with the desired polymerizable material. The solvent can be a polar or a non-polar solvent, a high boiling point solvent or a low boiling point solvent, and in some embodiments the solvent includes a mixture of several solvents. The solvent or solvent mixture may be selected so that the nanovoided layer formed is at least partially insoluble in the solvent (or at least one of the solvents in a solvent mixture). In some embodiments, the solvent mixture can be a mixture of a solvent and a non-solvent for the polymerizable material. In one particular embodiment, the insoluble polymer matrix can be a three-dimensional polymer matrix having polymer chain linkages that provide the three dimensional framework. The polymer chain linkages can prevent deformation of the layer after removal of the solvent.

In some cases, solvent can be easily removed from the solvent-laden microstructured layer by drying, for example, at temperatures not exceeding the decomposition temperature of either the insoluble polymer matrix, or the substrate on which it is carried. In one particular embodiment, the temperature during drying is kept below a temperature at which the substrate is prone to deformation, e.g., a warping temperature or a glass-transition temperature of the substrate. Exemplary solvents include linear, branched, and cyclic hydrocarbons, alcohols, ketones, and ethers, including for example, propylene glycol ethers such as DOWANOL™ PM propylene glycol methyl ether, isopropyl alcohol, ethanol, toluene, ethyl acetate, 2-butanone, butyl acetate, methyl isobutyl ketone, methyl ethyl ketone, cyclohexanone, acetone, aromatic hydrocarbons, isophorone, butyrolactone, N-methylpyrrolidone, tetrahydrofuran, esters such as lactates, acetates, propylene glycol monomethyl ether acetate (PM acetate), diethylene glycol ethyl ether acetate (DE acetate), ethylene glycol butyl ether acetate (EB acetate), dipropylene glycol monomethyl acetate (DPM acetate), iso-alkyl esters, isohexyl acetate, isoheptyl acetate, isooctyl acetate, isononyl acetate, isodecyl acetate, isododecyl acetate, isotridecyl acetate or other iso-alkyl esters, water; combinations of these and the like.

The coating solution used during manufacture of the nanovoided layer can also include other ingredients including, e.g., initiators, curing agents, cure accelerators, catalysts, crosslinking agents, tackifiers, plasticizers, dyes, surfactants, flame retardants, coupling agents, pigments, impact modifiers including thermoplastic or thermoset polymers, flow control agents, foaming agents, fillers, glass and polymer microspheres and microparticles, other particles including electrically conductive particles, thermally conductive particles, fibers, antistatic agents, antioxidants, optical down converters such as phosphors, UV absorbers, and the like.

An initiator, such as a photoinitiator, can be used in an amount effective to facilitate polymerization of the monomers present in the coating solution. The amount of photoinitiator can vary depending upon, for example, the type of initiator, the molecular weight of the initiator, the intended application of the resulting microstructured layer, and the polymerization process including, e.g., the temperature of the process and the wavelength of the actinic radiation used. Useful photoinitiators include, for example, those available from Ciba Specialty Chemicals under the IRGACURE™ and DAROCURE™ trade designations, including IRGACURE™ 184 and IRGACURE™ 819.

In some embodiments, a mixture of initiators and initiator types can be used, for example to control the polymerization in different sections of the process. In one embodiment, optional post-processing polymerization may be a thermally initiated polymerization that requires a thermally generated free-radical initiator. In other embodiments, optional post-processing polymerization may be an actinic radiation initiated polymerization that requires a photoinitiator. The post-processing photoinitiator may be the same or different than the photoinitiator used to polymerize the polymer matrix in solution.

The nanovoided layer may be cross-linked to provide a more rigid polymer network. Cross-linking can be achieved with or without a cross-linking agent by using high energy radiation such as gamma or electron beam radiation. In some embodiments, a cross-linking agent or a combination of cross-linking agents can be added to the mixture of polymerizable monomers, oligomers or polymers. The cross-linking can occur during polymerization of the polymer network using any of the actinic radiation sources described elsewhere.

Useful radiation curing cross-linking agents include multifunctional acrylates and methacrylates, such as those disclosed in U.S. Pat. No. 4,379,201 (Heilmann et al.), which include 1,6-hexanediol di(meth)acrylate, trimethylolpropane tri(meth)acrylate, 1,2-ethylene glycol di(meth)acrylate, pentaerythritol tri/tetra(meth)acrylate, triethylene glycol di(meth)acrylate, ethoxylated trimethylolpropane tri(meth)acrylate, glycerol tri(meth)acrylate, neopentyl glycol di(meth)acrylate, tetraethylene glycol di(meth)acrylate, 1,12-dodecanol di(meth)acrylate, copolymerizable aromatic ketone co-monomers such as those disclosed in U.S. Pat. No. 4,737,559 (Kellen et al.) and the like, and combinations thereof.

The coating solution used during manufacture of the nanovoided layer may also include a chain transfer agent. The chain transfer agent is preferably soluble in the monomer mixture prior to polymerization. Examples of suitable chain transfer agents include triethyl silane and mercaptans. In some embodiments, chain transfer can also occur to the solvent; however this may not be a preferred mechanism.

The polymerizing step may include using a radiation source in an atmosphere that has a low oxygen concentration. Oxygen is known to quench free-radical polymerization, resulting in diminished extent of cure. The radiation source used for achieving polymerization and/or crosslinking may be actinic (e.g., radiation having a wavelength in the ultraviolet or visible region of the spectrum), accelerated particles (e.g., electron beam radiation), thermal (e.g., heat or infrared radiation), or the like. In some embodiments, the energy is actinic radiation or accelerated particles, because such energy provides excellent control over the initiation and rate of polymerization and/or crosslinking. Additionally, actinic radiation and accelerated particles can be used for curing at relatively low temperatures. This avoids degrading or evaporating components that might be sensitive to the relatively high temperatures that might be required to initiate polymerization and/or crosslinking of the energy curable groups when using thermal curing techniques. Suitable sources of curing energy include UV LEDs, visible LEDs, lasers, electron beams, mercury lamps, xenon lamps, carbon arc lamps, tungsten filament lamps, flashlamps, sunlight, low intensity ultraviolet light (black light), and the like.

In some embodiments, binder 510 may include a multifunctional acrylate and polyurethane. This binder 510 can be a polymerization product of a photoinitiator, a multifunctional acrylate, and a polyurethane oligomer. The combination of a multifunctional acrylate and a polyurethane oligomer can produce a more durable nanovoided layer 500. The polyurethane oligomer is ethylenically unsaturated. In some embodiments, the polyurethane or polyurethane oligomer is capable of reacting with acrylates or "capped" with an acrylate to be capable of reacting with other acrylates in the polymerization reaction described herein.

In one illustrative process, a solution is prepared that includes a plurality of nanoparticles (optional), and a polymerizable material dissolved in a solvent, where the polymerizable material can include, for example, one or more types of monomers. The polymerizable material is coated onto a substrate and a tool is applied to the coating while the polymerizable material is polymerized, for example by applying heat or light, to form an insoluble polymer matrix in the solvent. In some cases, after the polymerization step, the solvent may still include some of the polymerizable material, although at a lower concentration. Next, the solvent is removed by drying or evaporating the solution resulting in nanovoided layer 500 that includes a network or plurality of voids 520 dispersed in polymer binder 510. The nanovoided microstructured layer 500 includes a plurality of nanoparticles 540 dispersed in the polymer binder. The nanoparticles are bound to the binder, where the bonding can be physical or chemical.

The fabrication of the nanovoided layer 500 and semi-specular reflective mirror articles described herein using the processes described herein can be performed in a temperature range that is compatible with the use of organic substances, resins, films and supports. In many embodiments, the peak process temperatures (as determined by an optical thermometer aimed at the nanovoided microstructured layer 500) may be 200 degrees centigrade or less, or 150 degrees centigrade or less, or 100 degrees centigrade or less.

In general, nanovoided microstructured layer 500 can have a desirable porosity for any weight ratio of binder 510 to plurality of nanoparticles 540. Accordingly, in general, the weight ratio can be any value that may be desirable in an application. In some cases, the weight ratio of binder 510 to a plurality of nanoparticles 540 is at least about 1:2.5, or at least about 1:2.3, or 1:2, or 1:1, or 1.5:1, or 2:1, or 2.5:1, or 3:1, or 3.5:1, or 4:1, or 5:1. In some cases, the weight ratio is in a range from about 1:2.3 to about 4:1.

The nanovoided layer can be tailored to have little scattering in some cases and significant scattering in other cases. This can be done by selecting the particle type and/or adjusting the particle concentration (as a proportion to the binder). If this is done in such a way that is favorable to the formation of large agglomerates and/or a large number of large-sized aggregates, the layer will be a significant scatterer. If this is done in such a way that is favorable to the formation of a small number of small-sized aggregates, the layer will have little scattering.

Scattering and Haze; Hemispheric Reflectivity

Figure 6:
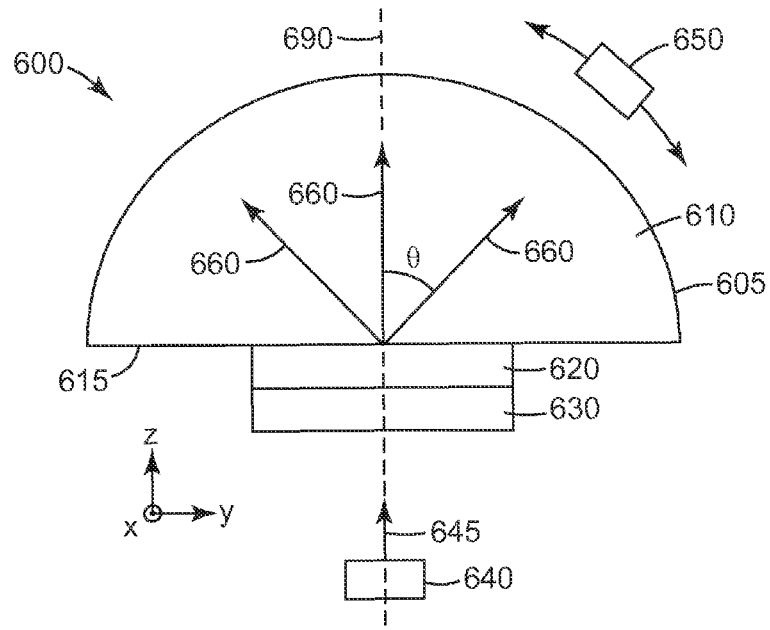
FIG. 6 is a schematic side view of an optical system for measuring transmissive scattering properties of an optical diffuser.
Figure 7:
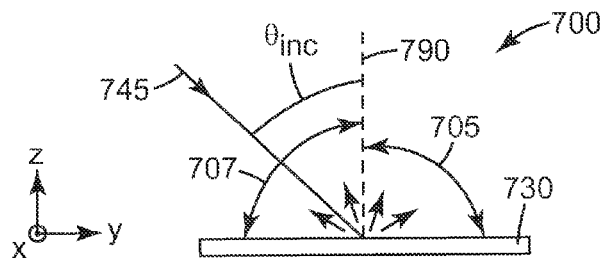
FIG. 7 is a schematic side view of an optical system for measuring reflective scattering properties of an optical diffuser.
Figure 8A:
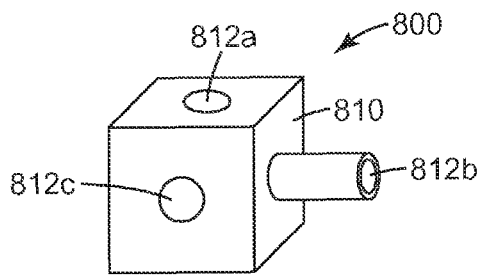
FIG. 8a is a schematic perspective view of an optical system for measuring total hemispherical reflectivity of an optical sample.
Figure 8B:
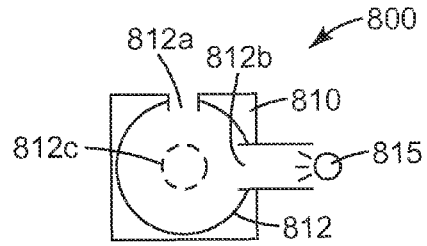

We now turn to FIGS. 6, 7, 8a, and 8b for further discussion and explanation of techniques for characterizing the haze or scattering provided by an optical body (FIGS. 6 and 7), and for characterizing the total hemispherical reflectivity of an optical body (FIGS. 8a and 8b).

We have already mentioned one approach for characterizing the haze or scattering provided by an optical body, namely, measuring the haze of the sample using a Haze-Gard Plus™ haze meter available from BYK-Gardner, Silver Springs, Md., or the like. In general terms, such an instrument calculates a ratio of the transmitted light that deviates from the normal direction by more than 4 degrees to the total transmitted light.

FIG. 6 is a schematic side view of an optical system 600 for measuring scattering or haze properties of a transmissive optical body 630. The optical body may be, for example, an optically clear substrate with a nanovoided scattering layer to be studied, or it may be another body or layer that scatters light via scattering centers distributed throughout the volume of the layer. The system 600 may be centered on an optical axis 690, relative to which scattering angles θ can be measured. The system 600 includes a hemisphere 610 that includes a spherical surface 605, a flat bottom surface 615, and an index of refraction "$n_h$". The system 600 also includes the optically diffusive film 630 to be tested, which is laminated to the bottom surface 615 of the hemisphere via an optical adhesive layer 620. The system 600 also includes a light source 640 that emits light 645, the light 645 preferably being substantially collimated and comprising wavelengths covering the wavelength range of interest, or a portion thereof. Also included is an optical detector 650 for detecting light that is scattered by test sample 630. The detector 650 is movably mounted as indicated so that measurements can be made over a range of scattering angles θ, e.g. from −90 to +90 degrees, so that the functional relationship of scattering intensity versus scattering angle can be determined.

Light 645 emitted by light source 640 propagates along optical axis 690 and is scattered by the optical body 630 inside the half-sphere 610, which has a relatively high refractive index $n_h$, i.e., $n_h$ is much greater than the refractive index of air. Accordingly, in the presence of the hemisphere, the optical system 600 measures the scattering of the optical body in a high-index medium. In an exemplary embodiment, the hemisphere is made of solid acrylic with a diameter of 63 mm and a refractive index of about 1.49, and the light source emits white light with a beam diameter of about 4 mm, but other design parameters can also be selected as appropriate. Ideally, the scattered light rays 660 originate near the center of curvature of the hemispheric surface 605. Thus, the rays 660 are transmitted through the surface 605 with little or no refraction, allowing the full hemispherical range of light scattered within the solid hemisphere to be extracted and measured in air. The adhesive layer 620 may be optically clear adhesive OCA 8171™ available from 3M, St Paul, Minn., which has a refractive index of about 1.47, but other clear adhesives or coupling gels or liquids may also be used. Preferably, the refractive index of the layer 620 is about equal to that of the hemisphere 610. In many cases, the refractive index of the acrylic hemisphere is about the same as the lowest refractive index of the microlayers within a broadband polymeric MOF mirror film. In those cases, measuring the scattering distribution of the optical body 630 in the system 600 essentially reveals how the light scattered by the optical body will propagate within the microlayers of an MOF mirror film when the optical body is attached or otherwise directly optically coupled to the MOF mirror film.

As described further below, we have found that nanovoided scattering layers can be made to exhibit a scattering distribution that advantageously provides substantially diminished scattering at very high angles of propagation within the scattering layer (and at very high angles of propagation within the MOF mirror film, and in particular within the lowest refractive index microlayers of the MOF mirror film) relative to a Lambertian scatterer. The scattering intensity may for example be greatly reduced over a range of glancing incidence angles, e.g., from 50 to 90 degrees, or from 60 to 80 degrees, or from 60 to 70 degrees, relative to light scattered at 0 degrees (along the optical axis or thickness axis of the layer or film). For example, the diffusing layer may be characterized by a scattering distribution into a substrate of refractive index "$n_s$" (where $n_s$ is a minimum refractive index of the microlayers within the MOF mirror film to which the diffusing layer is coupled) when illuminated by a normally incident beam of visible light. The scattering distribution may have a value $S_0$ at a scattering angle (i.e., a deviation angle within the substrate relative to the normally incident beam) of 0 degrees and a value $S_{60}$ at a scattering angle of 60 degrees, and $S_{60}$ may be less than 10% of $S_0$. The scattering distribution may have a value $S_{70}$ at a scattering angle of 70 degrees and a value $S_{50}$ at a scattering angle of 50 degrees, and $S_{70}$ and $S_{50}$ may also be less than 10% of $S_0$.

The system 600 can also be modified to measure the scattering distribution (scattered light intensity as a function of angle) for the optical body 630 when the optical body is immersed in air rather than in the higher refractive index $n_h$ of the hemisphere 610. This can be done by removing the hemisphere 610 and the adhesive layer 620 so that the major surface of body 630 from which light is emitted is exposed to air rather than to the higher index medium of the layer 620 and hemisphere 610. In this way, the detector 650 detects and measures the light scattering of the diffusive optical body 630 in a low-index medium, i.e., air.

Another way of characterizing the scattering or haze of an optical body is by measuring its "transport ratio" using a system similar to that shown in FIG. 7. The transport ratio can also be used as a parameter to describe the degree of semi-specularity of a given reflector, i.e., the relative amounts of specular reflection versus Lambertian reflection or scattering. FIG. 7 depicts an optical system 700 for measuring scattering or haze properties of a reflective optical body 730. The optical body 730 may for example be a semi-specular mirror construction as shown in either of FIG. 4a or 4b, or it may be another mirror film or body whose scattering properties are unknown.

In system 700, a substantially collimated beam of light 745 is incident at an angle $\theta_{inc}$, which is assumed to be 45 degrees unless otherwise indicated to the contrary. The light 745 comprises wavelengths covering the wavelength range of interest, or a portion thereof. The light 745 is also unpolarized unless otherwise indicated. An optical detector (not shown) detects light that is scattered by test sample 730, the detector being capable of measuring the sum of all light scattered in forward directions 705 relative to an optical axis or surface normal 790, and also capable of measuring the sum of all light scattered in backward directions 707 relative to the surface normal 790. The forward-scattered flux, referred to here as "F", and the backward-scattered flux, referred to as "B", can be obtained by integrating the reflected intensities over the quarter-sphere ranges of solid angles represented by the reference numerals 705 and 707, respectively. Given the measured/calculated values F and B for a given sample, the transport ratio T of that sample is given by:

$$T=(F-B)/(F+B).$$

A purely specular reflector will have no backscatter (B=0), and thus T=1. A purely Lambertian reflector will have an equal amount of backscatter and forward scatter (F=B), and thus T=0. Values between 0 and 1 indicate a mix of specular and Lambertian reflection. In exemplary embodiments, the semi-specular mirror constructions discussed herein (e.g. those depicted generally in FIGS. 4a and 4b) exhibit a transport ratio T of less than 80%, or less than 60%, or less than 40%, for example. Such transport ratios can be provided in semi-specular mirror films that have high hemispheric reflectivity (e.g. at least 97% when a rear surface of the mirror film is in contact with an absorbing material) and low loss, the MOF mirror film component of which may have a broad reflection band whose long wavelength band edge for normally incident light is disposed at a wavelength that need not be greater than 1600 nm, or 1400 nm, or 1200 nm, or 1000 nm.

Another significant property of the disclosed semi-specular mirror film constructions is their ability to have low absorption and transmission losses even when a back surface construction is in contact with an absorbing material such as a black tape or paint. This may be stated differently by saying that the disclosed semi-specular mirror film constructions have a very high overall reflectivity or very high hemispheric reflectivity, e.g., at least 97%, even when the back surface of the construction is in contact with an absorbing material. The optical system 800 depicted generally in FIGS. 8a and 8b can be used to measure the hemispheric reflectivity. The system 800 includes a housing 810 within which a low loss, high reflectivity integrating sphere 812 is placed. The sphere may for example be coated on the inner surface thereof with Spectralon™ (Labsphere, Inc., North Sutton, N.H.) reflective coating. The integrating sphere has three access holes or ports cut therein in a mutually perpendicular orientation as shown: a sample port 812a, a light source port 812b, and a detector port 812c. A piece of the mirror construction under test is placed at the sample port 812a, preferably in such a way that the piece of mirror substantially fills the hole or port. A light source 815, which emits light at wavelengths covering the wavelength range of interest or a portion thereof, is placed at the port 812b, and the light is reflected within the integrating sphere 812 in all directions, and such light is incident on the mirror sample at port 812a from all directions in air. A detector (not shown) is placed at the detector port 812c.

The hemispheric reflectivity of the mirror sample is obtained by comparing the detector output under two conditions: one in which the mirror sample is present at the sample port 812a, and one in which the mirror sample has been removed and the port 812a is open. The difference between these detector outputs can then be associated with the hemispheric reflectivity of the sample. Before testing the sample, the system 800 can be calibrated with a sample of known reflectivity.

Note that the value of hemispheric reflectivity for a particular sample does not by itself provide an indication of whether the sample is a diffuse reflector, or a specular reflector, or a semi-specular reflector. Any one of a diffuse reflector, a specular reflector, or a semi-specular reflector may in general exhibit a very high, or very low, or intermediate value of hemispheric reflectivity. The disclosed semi-specular reflectors, however, advantageously exhibit hemispheric reflectivities of at least 94% when the semi-specular reflector is based on a conventional MOF mirror film having a high wavelength band edge near 900-1000 nm, and at least 98% when the semi-specular reflector is based on a broadband MOF mirror film having a high wavelength band edge near 1600 nm, even when the back surface of the reflector is in contact with an absorbing material. These high reflectivities are indicative of very low losses due to absorption and other factors, such losses being less than 6% and 2%, respectively.

EXAMPLES

Preparing Nanoporous Low Index Diffuse Coatings

Particles

Fumed silicon dioxide, (f-SiO$_2$) and fumed aluminum oxide (f-Al$_2$O$_3$) particles were obtained from Cabot Corporation, Billerica, Mass. TS-530™ is a hydrophobic surface modified f-SiO$_2$ with a surface area of about 225 m$^2$/g. Spec-Al 100™ is f-Al$_2$O$_3$ with a surface area of approximately 95 m$^2$/g. These fumed metal oxide particles were obtained as dry powders. In order to improve the quality of mixing these particles into coating formulations, the dry powders were first put into 10% solids premixes with the desired solvent. Isopropyl alcohol or methyl ethyl ketone were used interchangeably for TS 530, and water was used for Spec-Al 100. Dry powder was mixed in the solvent using a low shear air driven laboratory mixer, followed by a high shear air driven laboratory mixer equipped with a 3-bladed paddle, until the particles were homogenously dispersed.

Cabo-Sperse PG 002™ and Cabo-Sperse 1020K™ (Cabot Corporation, Billerica, Mass.) are 20% solids dispersions of f-SiO$_2$ in water.

Polytetrafluoroethylene (PTFE) micropowder F300™ was obtained from Micropowder Technologies of Tarrytown, N.Y. Sekisui-MBX-5™ (Sekisui-USA, New York, N.Y.) is crosslinked polymethylmethacrylate (PMMA) in the form of 5-8 micron beads. These two types of nonporous diffuser beads were dispersed using the same procedure as detailed above for the dry powder metal oxides.

Binder Resins

Dyneon THV-220™ (Dyneon LLC, Oakdale, Minn.) is a fluorothermoplastic made from tetrafluoroethylene, vinylidene fluoride and hexafluoropropylene monomers. Dyneon FC 2145™ (Dyneon LLC, Oakdale, Minn.) is a fluoroelastomer made from vinylidene fluoride and hexafluoropropylene monomers. For use in preparing coating mixtures, THV-200 pellets were first dissolved to 12% solids in a mixture of 97% methyl ethyl ketone and 3% butyl acetate. FC 2145 in gum form was likewise dissolved to 10% solids in methanol. Polyvinyl alcohol PVA-235™ (Kuraray-USA, Houston, Tex.) was dissolved to 7% solids in water at 80-90 C with stirring. PMMA V0-44™ (Rohm and Haas C., a wholly owned division of Dow Chemical Co., Midland, Mich.) is a methylmethacrylate-ethylacrylate copolymer.

Ebecryl 8807™ (Cytec Industries, Inc., Smyrna, Ga.) is a polyurethane acrylate macromer (PUA). Coatings containing PUA were cured with ultraviolet radiation, using 1% Esacure KB-1™ (Lamberti S.p.A., Gallarate, Italy) as the photoinitiator. A Light Hammer 6™ (Fusion UV Systems, Inc., Gaithersburg, Md.) system was used, employing a 500 Watt H-bulb at 100% power. The UV cure chamber was purged with dry nitrogen. Coated films were exposed to the UV light at 40 fpm for 2 passes.

SPU-5K is a silicone polyurea formed from the reaction between alpha,omega-aminopropyl polydimethyl siloxane and m-tetramethyl xylene diisocyanate, as described in U.S. Pat. No. 6,355,759 (Sherman, et al.), Example #23.

Coating Process for Hand-Spreads

Small laboratory scale hand spread coatings of good optical quality were prepared by coating a low index coating solution on a film substrate. The film was held flat using a level 14×11 in. (35.6 cm by 27.9 cm) vacuum table model 4900™ (Elcometer Inc., Rochester Hills, Mich.). Coating solution was spread evenly on PET film using a wire wound coating rod or "Meyer rod" (RD Specialties, Webster, N.Y.) or, for thinner coatings, by use of a knife bar available from Elcometer, Inc., Rochester Hills, Mich. A standard sheet of white paper (8.5×11 in) was placed between the vacuum table and optical film to prevent coating defects associated with the vacuum table. Each coating was made using a degassed solution to avoid optical defects such as air bubbles and surface cracks. A 5-8 ml sample of the coating solution was placed near the top of the film and the coating was spread using either a number 45 or a number 30 Meyer rod which provided a coating with a nominal wet thickness of 4.5 or 3.0 mils (114 or 76.2 microns), respectively. When a knife bar was used, a 2 to 4 mil (50.8-101.6 microns) knife bar gap provided a coating with a nominal wet thickness of 1 to 2 mils (25.4 to 50.8 microns) respectively. Each wet coating was allowed to air dry at room temp for about 2-3 minutes and the specimen was then carefully transferred to a flat glass plate and put in a forced air oven set at 50 C, to dry completely. The coatings were covered with an appropriately sized inverted aluminum pan to reduce drying patterns on the film due to air movement in the oven.

The process was modified for UV cured coated articles in Examples 4-6. After coating, the samples were dried briefly at room temperature followed by complete drying at 85 C for 2 min. The coatings were then cured using the procedures described above.

Coating Process for Automated Coating

The coater utilized a slot die with the film substrate supported against a back-up roll. The gap between the slot die and backup roll was adjusted to accommodate the film and to produce a stable coating across the film. A 2.93 cc/rev Zenith™ gear pump (Zenith Pumps, Monroe, N.C.) was used to pump coating solution through a 30 micron filter (Roki Techno Co, Ltd., Tokyo, Japan) and into the slot die. When an MOF mirror film was to be coated, it was first exposed to a 750 mJ/cm² corona discharge in a nitrogen atmosphere. When a primed PET film was to be coated, no additional surface preparation was needed. After the coating was applied, film was dried in an impingement oven at 80 C with an air velocity of 20 m/s and a residence time of about one minute. Coating speed was 15 ft/min (4.57 m/min) unless otherwise noted and the coating width was 10 in. (25.4 cm).

Substrate Films

For some of the optical measurements, 2 mil (50 micron) primed PET film 689™ (DuPont—Teijin Films USA, Chester, Va.) was used. Exemplary semi-specular mirror films were prepared using broadband mirror film substrates similar to 3M Vikuiti Enhanced Specular Reflector (ESR)™ (3M, St. Paul, Minn.). The commercial film has a long wavelength band edge disposed in a region from about 900-1000 nm (for normally incident light). By modifying the manufacturing procedure in ways known in the art, i.e., by modifying the optical packet or optical stack structure (layer thickness profile) through such methods as those described in U.S. Pat. No. 6,783,349 (Neavin et al.), by changing the number of packets or stacks, and/or by changing the total number of layers, films having high wavelength band edges extended to 1200 nm, 1400 nm, and 1600 nm were prepared.

Refractive Index, Optical Transmission, Haze and Clarity Measurements

These optical measurements were obtained on exemplary coatings made on PET film substrates, since the mirror film substrates are highly reflective and thus, not transmissive.

Refractive index (RI) values were determined by use of the prism coupling method using a Metricon 2010M™ Prism Coupler (Metricon Corp., Pennington, N.J.). The RI(n) was determined at 633 nm. Accurate determination of the refractive index of the higher haze coatings was best determined by measuring the refractive index in the TM polarization state through the PET side of the coated film. In this procedure, the prism and the PET side of the coated films were coupled and the RI measurement was scanned from n=1.55 to n=1.05. This method resulted in the detection of two critical angle transitions; one associated with the PET-prism interface at approximately n=1.495 and another associated with the PET-low index coating interface. Because this second transition was often not sharp, the Metricon raw data were analyzed to determine the critical angle of this second transition by use of a 200 point smoothing analysis program, applied to the regions above and below the inflection point of this second critical angle. Two linear regions were determined from the smoothed data and the intersection of these two lines corresponded to the inflection point of the curve and thus the RI, or an effective RI, of the low refractive index coating.

Transmission, haze, and clarity values were determined using a BYK-Gardner Haze Gard Plus™ (BYK-Gardner USA, Columbia, Md.). The reported values represent the average of at least 3 measurements taken from different regions on the coated film.

Hemispherical Reflectivity (% R) Measurements

Hemispherical reflectivity was measured using an integrating sphere method. The apparatus is shown in FIG. 8a and FIG. 8b, and has been described above. The hemispherical reflectivity is the total reflectivity of the sample, i.e., the reflectivity integrated over all angles of incidence.

The integrating sphere was set up so that the test specimen was not directly imaged at any time. The incoming light impinged on the sphere and was diffusely reflected. The reflected light then impinged on the sample at all incidence angles. The intensity as a function of wavelength was measured at the sample port using a ProMetric PR650™ camera (Radiant Imaging, Inc., Redmond, Wash.).

Two measurements were taken for each test, and used to compute the reflectivity. The intensity was first measured with the test specimen on the sample port, then the specimen was removed and the intensity was measured with the port open. The ratio of these intensities is the cavity gain. The gain equation was then solved for the sample reflectivity for each wavelength. The gain equation is:

$$g(\lambda) = \frac{1}{1 - R_{sample}(\lambda) * R_{cavity}(\lambda)}$$

where g is the cavity gain, $R_{sample}$ is the reflectivity of the specimen, $R_{cavity}$ is the reflectivity of the cavity, and $\lambda$ is the wavelength of light. The cavity reflectivity was obtained by measuring a standard of known reflectivity first and then solving the gain equation for the cavity reflectivity. A Spectralon Reference Target SRT-99-050™ (Labsphere, Inc., Sutton, N.H.) was used.

To calculate % R Loss, two measurements were made. First the reflectivity of the diffuse reflector film was recorded. Then the reflectivity of the diffuse reflector film was recorded with an absorbing material (black vinyl tape) laminated to the back side of the film. The absorbing material allows light that is not reflected by the optical stack and that would normally be reflected by total internal reflection to escape and, hence, the difference in reflectivity between the first and second measurements is a measure of the amount of light leaking through the optical stack. Therefore it is desirable to have the % R loss value be as low as possible.

Light Transport Ratio (Tr) Measurements

Transport Ratio was measured using an apparatus shown schematically in FIG. 7 and described above. The transport ratio in essence describes the degree of specularity or semi-specularity of a given reflector or other component. A thorough description of transport ratio and its use in the design of optical systems is given in published application WO2008/144644.

The degree of semi-specularity or transport ratio Tr can be described by the following equation:

$$Tr=(R_F-R_B)/(R_F+R_B)$$

$R_F$=flux of the forward scattering light components
$R_B$=flux of the backward scattering light components
where Tr can range from −1 ($R_F$=0, Retroreflective) to 0 ($R_F$=$R_B$ Lambertian) to 1 ($R_B$=0 purely specular). $R_F$ and $R_B$ can be obtained from the integrated reflection intensities over all solid angles. The case where Tr is less than zero, ($R_B$>$R_F$), the film construction is considered to be retroreflective in that more light is directed back to light source than is reflected forward.

The Tr for any real reflective or transmissive component is a function of the incidence angle of the light. For purposes of this application, unless otherwise specified, Tr is determined at an angle of incidence (aoi) of 45 degrees.

To measure transport ratio, a ConoScope™ (Autronic-Melchers, Karlsruhe, Germany) with optional reflection mode was used. To measure Tr, a specimen was illuminated at the specified angle of incidence (45 degrees) and then the reflected light was measured by the ConoScope using a 2 mm aperture. The Autronic software was used to calculate Tr from this data using the formula above.

Example 1

50 g of methanol and 15 g of TS 530 were charged to a 400 ml plastic laboratory beaker equipped with an air driven 3-blade paddle stirrer. The TS 530 powder was added to the stirred methanol in small portions to aid in dispersion. The agitator was at first run slowly until the particles were wetted by the solvent. The mixture became very viscous and about 50 g of additional methanol was added slowly. It was necessary to use a wooden spatula to repeatedly push the particles that adhered to the side of the flask back into the mixture. Once all the particles were immersed in the solvent, the agitation rate was increased and an additional small amount of methanol was added. The solids content of the final mixture was found to be 14%. During storage, the particle mixture was placed on a standard laboratory shaker set at low speed to ensure the particles did not settle out of the mixture. Using the same mixing apparatus, 30 g of 10% FC 2145 in methanol was charged to a 200 ml plastic beaker and the mixer was set to a slow speed. 64 g of the TS 530 methanol mixture (which, at 14% solids, corresponded to 9 g of TS 530 solids) was added to the polymer solution. This addition greatly increased the viscosity of the mixture and the agitation rate was increased to ensure complete mixing. After the components were thoroughly mixed, the final mixture was transferred to a brown glass bottle, sealed and placed on a laboratory mixer to prevent settling of the particles from the mixture.

The coating mixture was coated on the broadband mirror film substrate described above having a bandwidth of 400 nm to 1600 nm. The Hand-spread coating process described above was used.

Examples 2-6

Examples 2-6 were prepared in the same manner as Example 1 but the solvent and resins were changed as shown in Table 1.

Examples 7-8

The coating mixtures used to prepare the specimens of Examples 7 and 8 were prepared from mixtures of PVA-235 and the fumed silicon oxide dispersion Cab-O-Sperse PG002™. Poly Cup 172™ (PC 172) was used as the crosslinker in the formulation. PC 172 is a polyamide-epichlorohydrin polymer available as a 12% solids solution in water from Hercules Corp. of Newark, Del. 100 g of deionized water, 0.5 ml of ammonium hydroxide (30 wt %) and 2.0 g of PC 172 (2.5 wt % based on PVA content) were added to an 800 ml plastic beaker and mixed thoroughly with a stirring rod. 300 g of Cab-O-Sperse PG002 fumed silicon oxide dispersion (20 wt % in water) and 2.0 g of surfactant Tergitol Min-Foam 1X™ (Dow Chemical of Midland, Mich.) (10 wt % in water) were then added. Once these were well mixed, 138.8 g of 7.2 wt % PVA 235 solution and another 160 g of deionized water were added to the mixture followed by additional mixing with a stirring rod. The coating mixture was transferred to a 1 L, 1-neck round bottom flask and placed on a Rotovap at 40 C and 600 mm Hg vacuum to degas the mixture. The final solids content of the mixture was adjusted to 10% wt. The final mixture on a dry weight basis had 1 part PVA resin to 6 parts silica (14.3% PVA by weight). The same substrate and coating process were used as for Example 1.

TABLE 1

Tr and % R Loss Values for Nanoporous Low Index Coatings on Wide Band Mirror Film

| Example | Wt % and Resin Type | Wt % and Particle Type | Solvent | Wet Thickness | Tr (45°) | % R Loss |
|---|---|---|---|---|---|---|
| 1 | 25% FC 2145 | 75% TS 530 | Methanol | 1.5 mil | 0.44 | 0.86 |
| 2 | 25% SPU-5K | 75% TS 530 | Isopropyl Alcohol | 1.5 mil | 0.24 | 0.91 |
| 3 | 25% PMMA | 75% TS 530 | Ethyl acetate | 1.5 mil | 0.49 | 0.75 |
| 4 | 25% PUA | 75% TS 530 | Isopropyl Alcohol | 0.7 mil | 0.98 | 1.06 |

TABLE 1-continued

Tr and % R Loss Values for Nanoporous Low Index Coatings on Wide Band Mirror Film

| Example | Wt % and Resin Type | Wt % and Particle Type | Solvent | Wet Thickness | Tr (45°) | % R Loss |
|---|---|---|---|---|---|---|
| 5 | 25% PUA | 75% TS 530 | Isopropyl Alcohol | 1.5 mil | 0.49 | 0.92 |
| 6 | 25% PUA | 75% TS 530 | Isopropyl Alcohol | 3.0 mil | 0.23 | 0.88 |
| 7 | 14.3% PVA | 85.7% PG002 | Water | 1.2 mil | 0.97 | 0.57 |
| 8 | 14.3% PVA | 85.7% PG002 | Water | 3.0 mil | 0.73 | 0.56 |

Examples 9-11

The coating mixtures used to prepare the specimens of Examples 9-11 were prepared using the same procedures as Examples 7-8, but the batch size was increased to 3000 g and the crosslinker PC 172 was replaced by the aziridine CX100™ (DSM, Wilmington, Del.). CX 100 was added at 5 wt % based on PVA solids. A laboratory air driven mixer was used to facilitate the mixing process. Several different substrate films, having different bandwidths, were used, as is shown in Table 2. All specimens were coated using the Automated Coating procedure detailed previously, and the coating mixture was adjusted to 15 wt % solids.

Comparative Examples C1-C4

Comparative Example C1 were prepared using the low refractive index resin THV 220 and the non-porous diffuser particles PTFE Micropowder F300. The particles (or "beads") and resins were mixed using the same procedure as was used for Examples 1-6, but the PTFE bead loading and resin loading were adjusted to those shown in Table 2, and the batch size was scaled up to 3000 g. Comparative Examples C2-C4, were prepared identically, except that 10 wt % of the PTFE F-300 was replaced by Spec Al 100™, to improve the light scattering effects of the coatings. The overall resin to bead ratio was held constant for these comparative examples.

oxide dispersion Cab-O-Sperse 1020K™. 138.8 g of 7.2 wt % PVA 235 solution (10.0 g PVA 235 on a dry weight basis) was charged to an 800 ml plastic beaker followed by the addition of 2.0 g of 10 wt % Tergitol Min-Foam 1X™ and 1 ml of concentrated ammonium hydroxide solution. These components were mixed thoroughly with a stirring rod. 300 g of Cab-O-Sperse 1020K™, at 20 wt % in water, was added, followed by the addition of 260 g of deionized water. After thorough mixing, the contents were transferred to a 1 L, 1-neck round bottom flask and placed on a Rotovap at 40 C and 600 mm Hg vacuum to degas the mixture. The final solids were adjusted to 10% wt. The final mixture on a dry weight basis had 1 part PVA resin to 6 parts silica (14.3% PVA by weight).

The coating mixtures used to prepare the specimens of Examples 14-15 were prepared in the same manner, except the resin to silica ratio was adjusted to 1:4 (20 wt % PVA). The coating mixtures were applied using the Automated Coating procedure described above. The coatings were applied at coating weights of 30 and 50 ml/min to broadband mirror film having a bandwidth of 400-1600 nm. Optical properties are summarized in Table 3.

Comparative Examples C5-C6

Fluoropolymer tandem coating mixtures were used to prepare comparative semi-specular bilayer coatings. The first layer was a 2.7-3 micron thick, low haze, low refractive

TABLE 2

Influence on Band Width on Tr and % R Loss

| Example | Wt % and Resin Type | Wt % and Particle Type | Film Bandwidth | Solvent | Wet Coating Weight (g/min) | Tr (45°) | % R Loss |
|---|---|---|---|---|---|---|---|
| 9 | 14.3% PVA | 85.7% PG002 | 400-1600 nm | Water | 50 | 0.60 | 0.50 |
| 10 | 14.3% PVA | 85.7% PG002 | 400-1400 nm | Water | 50 | 0.84 | 0.30 |
| 11 | 14.3% PVA | 85.7% PG002 | 400-1200 nm | Water | 30 | 0.83 | 0.20 |
| C1 | 33% THV | 67% PTFE | 400-1600 nm | MEK | 57 | 0.61 | 1.5 |
| C2 | 33% THV | 60% PTFE 7% Al2O3 | 400-1600 nm | MEK | 43 | 0.5 | 2.53 |
| C3 | 33% THV | 60% PTFE 7% Al2O3 | 400-1400 nm | MEK | 40 | 0.35 | 3.3 |
| C4 | 33% THV | 60% PTFE 7% Al2O3 | 400-1200 nm | MEK | 40 | 0.41 | 4.9 |

The optical data shows that the Exemplary nanoporous coatings on the mirror films have very low % R loss compared to the Comparative diffuser coatings.

Examples 12-15

The coating mixtures used to prepare the specimens of Examples 12-13 contained PVA-235 and fumed silicon index THV layer (THV 200, n=1.36). The second layer (top layer) was a common bulk diffuser composition The bottom THV low index layer was coated from a 12% MEK/BA solution (as described previously) onto mirror film having a bandwidth of 400-1600 nm. The THV coating solution was applied using the Automated Coating procedure described above at a flow rate of 132 ml/min. The same substrate film was used as in Ex. 12-15. The broadband mirror film coated with this THV layer became the input film for the non porous diffuser layer containing polyvinyl butyral (PVB), SR454™, and Sekisui-MBX-5™ diffuser beads. Butvar 74™ (PVB-74) is available from Solutia Inc. St. Louis Mo. This polymer was dissolved at 10% solids in 93/7 isopropyl alcohol/acetone before addition of the diffuser beads. SR454™ is methoxylated trimetholpropane triacrylate available from Sartomer Corp., Exton, Pa. The final diffuser coating mixture comprised a 33/67 wt % blend of (PVB-74+SR 454) and PMMA beads at 14 wt % solids in 93/7 IPA/acetone solvent blend. The resin mixture of the PVB-74+SR 454 comprised 55 wt % PVB-74 and 45 wt % SR 454. In order to ensure complete bead dispersion, the coating mixture was mixed at high shear using a PreMax™ single stage roto-stator mixer (Charles Ross & Son Co., Hauppauge, N.Y.) operating at 4000 rpm for 5 minutes. The coating solution was applied to the THV layer using the Automated Coating procedure at flow rates of 30 and 50 ml/min to produce the two Comparative Examples with dry coating thicknesses of 6 and 8 microns. The dried coating was UV cured by exposure to a 600W H-bulb using 0.5 wt % Esacure KB-1™ as the photo initiator based on SR 454 content. The optical properties are summarized in Table 3.

Figure 9A:
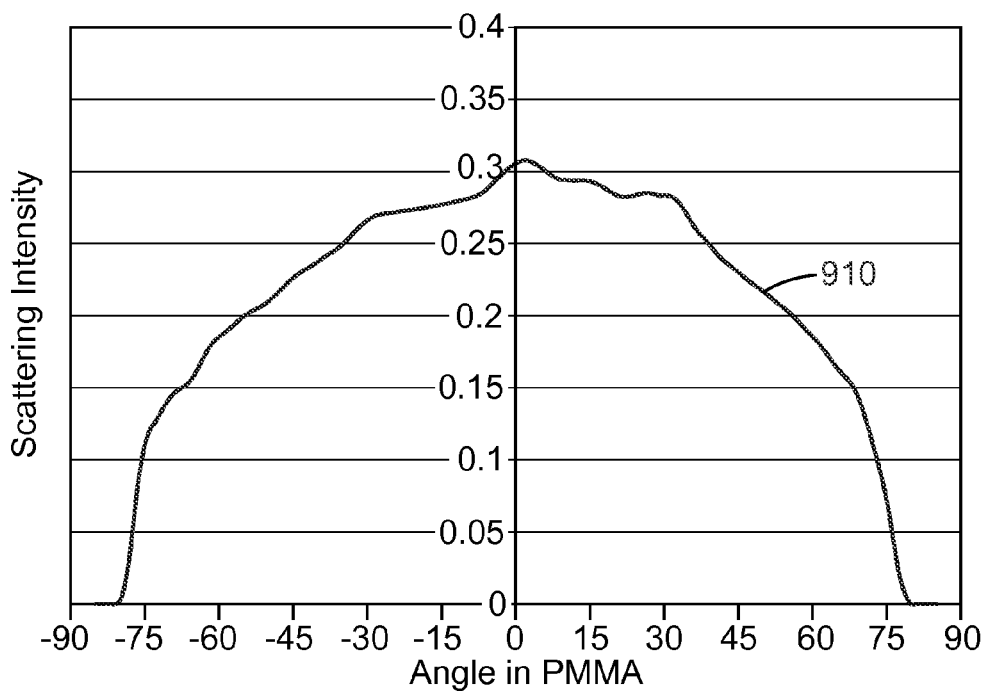
FIG. 9a is a plot of Scattering Intensity as a function of Scattering Angle for a Comparative film.
Figure 9B:
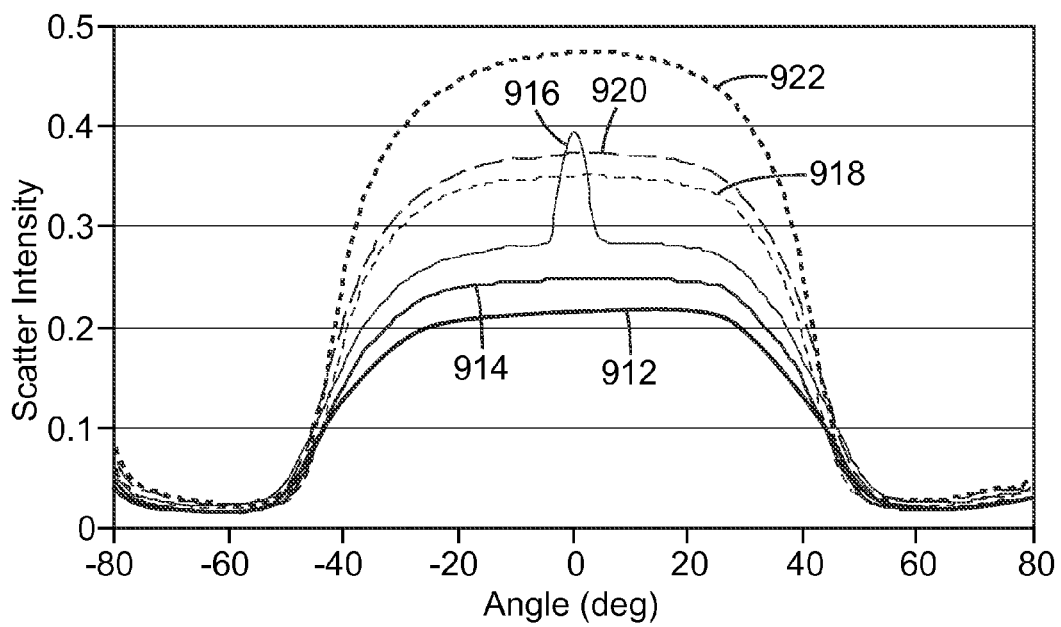
FIG. 9b is a family of plots of Scattering Intensity as a function of Scattering Angle for several Exemplary films.

FIG. 9b shows the results of additional optical testing on the specimens of Examples 16-18. The scattering intensity is plotted as a function of the angle, measured from the normal. The apparatus shown in FIG. 6 (described previously) was used to generate the curves. Curve 918 relates to Example 16, coated at 4 mils wet thickness. Curve 922 relates to Example 16, coated at 8 mils wet thickness. Curve 914 relates to Example 17, coated at 4 mils wet thickness. Curve 916 relates to Example 17, coated at 8 mils wet thickness. Curve 912 relates to Example 18, coated at 4 mils wet thickness. Curve 920 relates to Example 18, coated at 8 mils wet thickness.

The small peak in curve 916 at zero angle is related to the optical "punch through" phenomenon, and has been removed from the other curves for clarity. It can be seen that each curve exhibits a characteristic semi-specular "signature"—Significant scattering intensity out to about +/−45 degrees, little or no scattering intensity at higher angles, and a tendency for the scattering intensity to be flattened across a significant range, from −25 degrees to +25 degrees.

TABLE 3

Single Layer Nanoporous Diffuse Low Index Coatings Compared to Bi-layer Tandem Diffuse Coatings

| Example | Wt % and Resin Type | Wt % and Particle Type | Solvent | Wet Coating Weight (ml/min) | Wt % Solids | Tr (45°) | % R Loss |
|---|---|---|---|---|---|---|---|
| 12 | 14.3% PVA | 85.7% 1020K | Water | 30 | 10% | 0.96 | 0.6 |
| 13 | 14.3% PVA | 85.7% 1020K | Water | 50 | 10% | 0.69 | 0.8 |
| 14 | 20% PVA | 80% 1020K | Water | 25 | 10% | 0.64 | 0.8 |
| 15 | 20% PVA | 80% 1020K | Water | 50 | 10% | 0.18 | 0.6 |
| C5 | 33 wt % PVB/SR454 | 67% PMMA MBX-5 | 97/3 Isopropyl alcohol/Acetone | 22 | 17% | 0.86 | 1.0 |
| C6 | 33 wt % PVB/SR454 | 67% PMMA MBX-5 | 97/3 Isopropyl alcohol/Acetone | 40 | 17% | 0.45 | 1.1 |

Examples 16-18

The coating mixtures used to prepare the specimens of Examples 16 and 17 were the same as described for Examples 12 and 13, respectively. The coating mixture used to prepare the specimens of Example 18 was prepared using the same procedures as Example 12 except that the resin to silica ratio was adjusted to 1:3 (25 wt % PVA). The coatings were made using the hand spread technique, at both 4 and 8 mils wet thickness, using coating mixtures adjusted to 10 wt % solids. The coatings were applied to PET film, so that optical properties of the coatings which require transparent (non-mirror) specimens could be measured. Optical properties were measured as described previously. The results are shown, for the 8 mil wet thickness specimens, in Table 4.

Examples 19-21

In these Examples, 3-Layer semi-specular mirrors comprising a nanoporous low haze low index coating layer and a non-porous diffuser coating layer were made. A broadband mirror film substrate was coated with the same coating mixture used in Example 9. This mixture was coated onto the broadband film using the Automated Coating procedure described above at a pump rate of 50 g/min to produce a porous low refractive index coating with a dry thickness of approximately 8 microns. The diffuser coating solution used to prepare Comparative Examples C4 and C5 was then coated on this once-coated film at three different coating weights, and cured, to produce the coated semi-specular

TABLE 4

Coating Optical Properties on Transparent PET Film

| Example | Wt % and Resin Type | Wt % and Particle Type | Transmission | Haze | Clarity | RI (n) |
|---|---|---|---|---|---|---|
| 16 | 14.3% PVA | 85.7% 1020K | 64% | 100% | 2% | 1.164 |
| 17 | 20.0% PVA | 80.0% 1020K | 55% | 100% | 8% | 1.191 |
| 18 | 25.0% PVA | 75.0% 1020K | 47% | 100% | 12% | 1.204 | coatings of Examples 19-21. Optical properties are shown in Table 5. Results from Example 9 are included for comparison.

Comparative Example C7

Comparative Example C7 was prepared exactly as Example 21, except that the broadband mirror film was not first coated with a nanoporous low haze low index layer. The non-porous diffuser coating layer was applied directly to the substrate film. Optical properties are shown in Table 5.

TABLE 5

3-Layer semi-specular mirrors comprising a nanoporous low haze low index coating layer and a non-porous diffuser coating layer

| Example | Wt % and Resin Type | Wt % and Particle Type | Diffuser | Diffuser Wet Coating Weight (g/min) | Tr (45°) | % R Loss |
|---------|---------------------|------------------------|----------------|-------------------------------------|----------|----------|
| 9       | 14.3% PVA           | 85.7% PG002            | none           | 0                                   | 0.60     | 0.50     |
| 19      | 14.3% PVA           | 85.7% PG002            | PVA/SR454 PMMA | 35                                  | 0.25     | 0.7      |
| 20      | 14.3% PVA           | 85.7% PG002            | PVA/SR454 PMMA | 25                                  | 0.10     | 0.6      |
| 21      | 14.3% PVA           | 85.7% PG002            | PVA/SR454 PMMA | 20                                  | 0.094    | 0.7      |
| C7      | none                | none                   | PVA/SR454 PMMA | 20                                  | 0.92     | 4.8      |

The Film of Comparative Example C7 was also tested for scattering intensity as a function of angle, by procedures identical to those of Ex. 16-18. The results are shown as curve 910 in FIG. 9a. In comparison to all the curves in FIG. 9b, it can be seen that the C7 film is much closer to a Lambertian scatterer, exhibiting significant scattering intensity out to much higher angles of +1-75 degrees, and it thus not as effective as a semi-specular mirror.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. For example, the reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. A reflective film, comprising:
   a multilayer optical film having a first major surface and a second major surface, wherein the multilayer optical film includes a plurality of microlayers configured to provide a broad reflection band that shifts as a function of incidence angle, the multilayer optical film having a long wavelength band edge disposed at a wavelength no greater than 1600 nm for normally incident light; and
   a diffusing layer in contact with the first major surface, the diffusing layer adapted to scatter visible light into the multilayer optical film over a range of angles such that the scattered light can be substantially reflected by the broad reflection band;
   wherein the diffusing layer comprises a polymer binder having a nanovoided morphology comprising a plurality of interconnected voids or a network of voids dispersed in the polymer binder; and
   wherein the reflective film has a total hemispheric reflectivity for visible light of at least 97% when the second major surface of the multilayer optical film is in contact with an absorbing material.

2. The reflective film of claim 1, wherein the broad reflection band has, for normally incident light, a long wavelength band edge disposed at a wavelength no greater than 1000 nm, wherein the reflective film provides visible light scattering corresponding to a transport ratio of less than 80%.

3. The reflective film of claim 2, wherein the transport ratio is less than 80%.

4. The reflective film of claim 2, wherein the transport ratio is less than 40%.

5. The reflective film of claim 1, wherein the diffusing layer has a void volume fraction of at least 30%.

6. The reflective film of claim 1, wherein the diffusing layer also comprises a plurality of particles.

7. The reflective film of claim 6, wherein the particles comprise silicon dioxide or alumina oxide.

8. The reflective film of claim 6, wherein the plurality of particles has a size distribution that includes particles with a size not greater than 1 micrometer, and aggregates of the particles.

9. The reflective film of claim 6, wherein a weight percent of particles in the diffusing layer is at least 50%.

10. The reflective film of claim 6, wherein the weight percent of particles in the diffusing layer is at least 66%.

11. The reflective film of claim 6, wherein the weight percent of particles in the diffusing layer is at least 75%.

12. The reflective film of claim 6, wherein the weight percent of particles in the diffusing layer is at least 80%.

13. The reflective film of claim 1, wherein the diffusing layer has a scattering distribution into a substrate of refractive index ns when illuminated by a normally incident beam of visible light, wherein ns is a minimum refractive index of the plurality of microlayers, and wherein the scattering distribution is substantially reduced at grazing angles in the substrate.

14. The reflective film of claim 1, wherein the diffusing layer has a scattering distribution into a substrate of refractive index ns when illuminated by a normally incident beam of visible light, wherein ns is a minimum refractive index of the plurality of microlayers, and wherein the scattering distribution has a value S0 at a scattering angle of 0 degrees and a value S60 at a scattering angle of 60 degrees, and wherein S60 is less than 10% of S0, and wherein the scattering angle is the deviation angle within the substrate relative to the normally incident beam.

15. The reflective film of claim 14, wherein the scattering distribution has a value S70 at a scattering angle of 70 degrees, and wherein S70 is also less than 10% of S0.

16. The reflective film of claim 14, wherein the scattering distribution has a value S50 at a scattering angle of 50 degrees, and wherein S50 is also less than 10% of S0.

* * * * *

UNITED STATES PATENT AND TRADEMARK OFFICE
CERTIFICATE OF CORRECTION

Page 1 of 1

PATENT NO. : 9,995,861 B2
APPLICATION NO. : 13/878625
DATED : June 12, 2018
INVENTOR(S) : William Coggio It is certified that error appears in the above-identified patent and that said Letters Patent is hereby corrected as shown below:

In the Specification

Column 13
Line 24, after "law." insert -- If --

Column 23
Line 45, delete "61/294,610," and insert -- 61/294,610 (Attorney Docket 66015US002) --

Column 38
Line 45, delete "PR650™" and insert -- PR-650™ --

Column 41
Line 20, delete "CX100™" and insert -- CX 100™ --

Column 45
Line 35, delete "+1-75" and insert -- +/-75 --

Signed and Sealed this
Tenth Day of September, 2019

Andrei Iancu
*Director of the United States Patent and Trademark Office*